United States Patent
Tsubusaki

(10) Patent No.: US 9,992,421 B2
(45) Date of Patent: Jun. 5, 2018

(54) IMAGE PICKUP APPARATUS HAVING FA ZOOM FUNCTION, METHOD FOR CONTROLLING THE APPARATUS, AND RECORDING MEDIUM

(71) Applicant: CANON KABUSHIKI KAISHA, Tokyo (JP)

(72) Inventor: Akihiro Tsubusaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 14/552,236

(22) Filed: Nov. 24, 2014

(65) Prior Publication Data

US 2015/0146011 A1    May 28, 2015

(30) Foreign Application Priority Data

Nov. 28, 2013 (JP) ................. 2013-245899

(51) Int. Cl.
*H04N 5/232* (2006.01)
*G01S 3/786* (2006.01)
(Continued)

(52) U.S. Cl.
CPC ....... *H04N 5/23296* (2013.01); *G01S 3/7864* (2013.01); *G06K 9/00228* (2013.01);
(Continued)

(58) Field of Classification Search
CPC ........... H04N 5/23296; H04N 5/23258; H04N 5/23212; H04N 5/23219; H04N 5/23245;
(Continued)

(56) References Cited

U.S. PATENT DOCUMENTS 7,855,744 B2     12/2010   Kimoto
2005/0012833 A1*  1/2005   Yokota ............... H04N 5/23296
                                                              348/240.99
(Continued)

FOREIGN PATENT DOCUMENTS

CN     101753845 A    6/2010
CN     102404505 A    4/2012
(Continued)

*Primary Examiner* — Thai Tran
*Assistant Examiner* — Christopher T Braniff
(74) *Attorney, Agent, or Firm* — Canon USA Inc., IP Division

(57) ABSTRACT

An image pickup apparatus includes a movement detector detecting movement of the apparatus, a subject detector detecting a subject, a setting unit setting a mode for controlling a zoom operation which is enabled as a first mode or second mode, and a controller controlling the zoom operation based on the enabled mode. In the first mode, the controller controls the zoom operation based on at least one of position or size of the detected subject. In the second mode, the controller performs a first zoom operation for changing a zoom magnification to a wide-angle side when a movement amount of the apparatus is a first amount larger than a predetermined amount and performs a second zoom operation for changing the zoom magnification to a telephoto side when a movement amount of the apparatus detected after execution of the first zoom operation is a second amount smaller than the predetermined amount.

26 Claims, 19 Drawing Sheets

(51) Int. Cl.
*G06K 9/00* (2006.01)
*G06K 9/32* (2006.01)

(52) U.S. Cl.
CPC ....... *G06K 9/3233* (2013.01); *H04N 5/23212* (2013.01); *H04N 5/23219* (2013.01); *H04N 5/23245* (2013.01); *H04N 5/23258* (2013.01)

(58) Field of Classification Search
CPC . G01S 3/7864; G06K 9/00228; G06K 9/3233
See application file for complete search history.

(56) References Cited

U.S. PATENT DOCUMENTS

2010/0118160 A1* 5/2010 Tsurumi ............... G06T 3/0087
 348/231.2
2010/0158493 A1* 6/2010 Miyasako .......... H04N 5/23212
 396/55

FOREIGN PATENT DOCUMENTS

| | | |
|---|---|---|
| CN | 102549471 A | 7/2012 |
| JP | 2009-225027 A | 10/2009 |
| JP | 2010-041365 A | 2/2010 |
| JP | 2012-060510 A | 3/2012 |
| JP | 2012-060595 A | 3/2012 |
| JP | 2013-009435 A | 1/2013 |
| JP | 2013-046149 A | 3/2013 |
| JP | 2013046149 * | 3/2013 |
| WO | 2011/122335 A1 | 10/2011 |

* cited by examiner

109

300

300

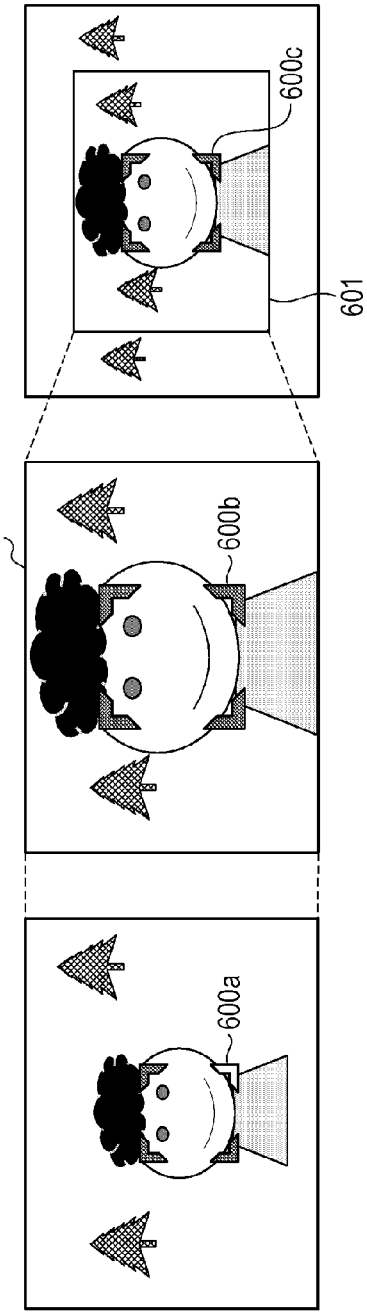
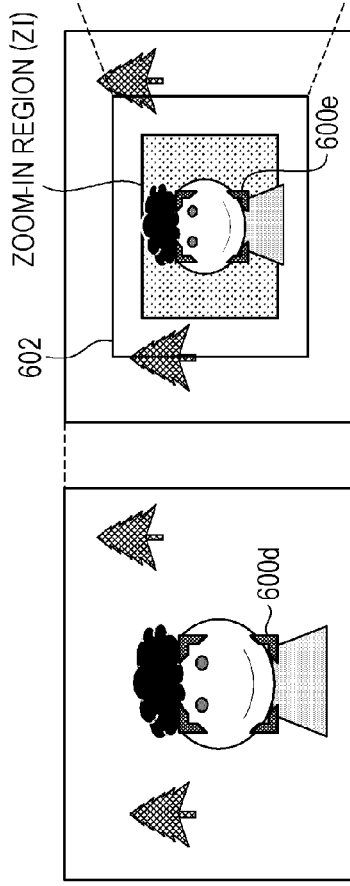

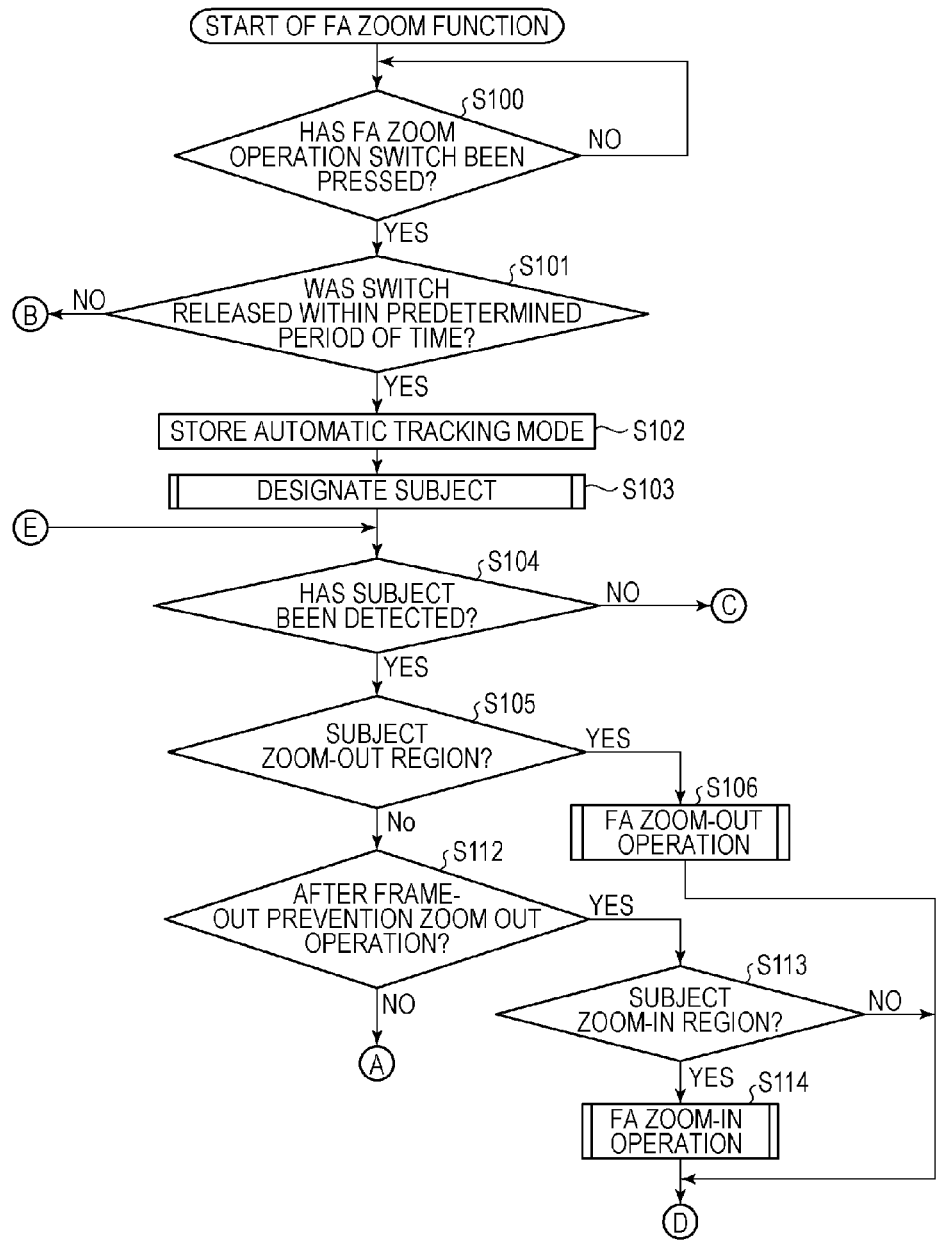

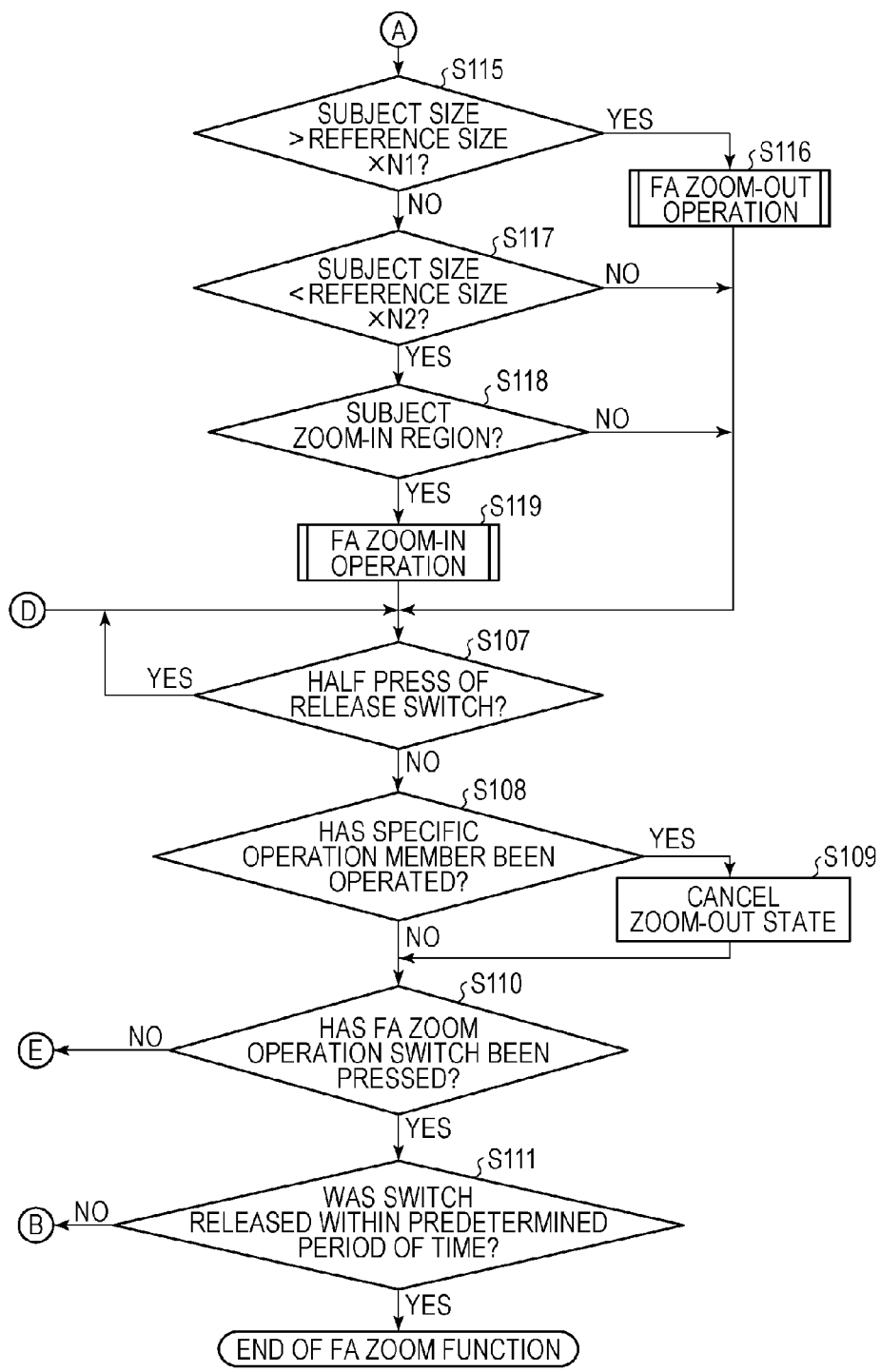

FIG. 15A

| FRAMING ASSIST ZOOM SETTING | | | |
|---|---|---|---|
| ZOOM-OUT AMOUNT | LARGE | MEDIUM | SMALL |
| AUTOMATIC MODE SETTING | OFF | | |
| MOVEMENT DETECTION SENSITIVITY | HIGH | | LOW |

FIG. 15B

| FRAMING ASSIST ZOOM SETTING | | | |
|---|---|---|---|
| ZOOM-OUT AMOUNT | LARGE | MEDIUM | SMALL |
| AUTOMATIC MODE SETTING | TRACKING | | |
| MOVEMENT DETECTION SENSITIVITY | HIGH | | LOW |

FIG. 15C

| FRAMING ASSIST ZOOM SETTING | | | |
|---|---|---|---|
| ZOOM-OUT AMOUNT | LARGE | MEDIUM | SMALL |
| AUTOMATIC MODE SETTING | SEARCHING | | |
| MOVEMENT DETECTION SENSITIVITY | HIGH | | LOW |

FIG. 15D

| FRAMING ASSIST ZOOM SETTING | | | |
|---|---|---|---|
| ZOOM-OUT AMOUNT | LARGE | MEDIUM | SMALL |
| AUTOMATIC MODE SETTING | TRACKING AND SEARCHING | | |
| MOVEMENT DETECTION SENSITIVITY | HIGH | | LOW |

IMAGE PICKUP APPARATUS HAVING FA ZOOM FUNCTION, METHOD FOR CONTROLLING THE APPARATUS, AND RECORDING MEDIUM

BACKGROUND OF THE INVENTION

Field of the Invention

The present invention relates to an image pickup apparatus having a frame assist zoom function and a method for controlling the image pickup apparatus.

Description of the Related Art

Image pickup apparatuses having a function of optically realizing variable magnification by driving a zoom lens (optical zoom) and a function of electronically realizing variable magnification by enlarging a portion of a captured image (electronic zoom) have been widely used. In image pickup apparatuses having the optical or electronic zoom function, it is likely that frame-out of a subject occurs when image capturing is performed in a telephoto state, and accordingly the frame-out issue needs to be addressed. Japanese Patent Application Laid-Open No. 2012-60595 discloses an image pickup apparatus having a framing assist (FA) zoom function (FA zoom function) as a function of rapidly capturing a subject when the subject is out of a frame. According to a configuration disclosed in Japanese Patent Application Laid-Open No. 2012-60595, control is performed such that zoom-out of a zoom position is performed in a wide-angle direction when start of FA zoom is instructed and zoom-in is performed to the zoom position obtained at the time of the start of the FA zoom when termination of the FA zoom function is instructed.

Furthermore, image pickup apparatuses having an automatic zoom function of automatically changing a zoom position in accordance with subject detection information have been widely used. Japanese Patent Application Laid-Open No. 2013-9435 discloses a configuration of a camera having an automatic zoom function of performing zoom-out to obtain an image pickup range including a detected subject when it is determined that the subject is out of an image pickup range.

In the FA zoom function disclosed in Japanese Patent Application Laid-Open No. 2012-60595, zoom-out and zoom-in are performed in response to an operation of a photographer. Here, to enhance usability of the camera for the photographer, it is assumed that a zoom operation is automatically enabled in accordance with a state of a subject even in the FA zoom function.

However, with the configuration disclosed in Japanese Patent Application Laid-Open No. 2013-9435, an automatic zoom function is not allowed to be operated when a subject is not detected. Therefore, in a case where automatic zoom is performed on the basis of information a face of a subject, when the subject moves while the face is facing sideways or rearward, the subject may not be detected due to lack of detection of its face, and accordingly, the automatic zoom function may not be operated. Therefore, if the subject is lost (frame-out occurs), the subject is required to be captured again by operating a zoom lever, refocusing, or the like in a general manner, and accordingly, a shutter release opportunity may be lost.

SUMMARY OF THE INVENTION

The various embodiments described in the present invention enable rapid re-capturing of a subject within an angle of view by an operation of detecting the subject and automatically controlling the angle of view even when the subject is lost.

According to an embodiment of the present invention, an image pickup apparatus includes a movement detection unit configured to detect a movement of the image pickup apparatus, a subject detection unit configured to detect a subject in an image obtained by the image pickup apparatus, a setting unit configured to set a mode for controlling a zoom operation which mode is individually enabled as a first mode or a second mode, and a control unit configured to control the zoom operation in accordance with the mode set by the setting unit. In the first mode, the control unit controls the zoom operation in accordance with at least one of a position and a size of the subject detected by the subject detection unit. In the second mode, the control unit performs a first zoom operation for changing a zoom magnification to a wide-angle side when a movement amount of the image pickup apparatus corresponds to a first amount which is larger than a predetermined amount, and performs a second zoom operation for changing the zoom magnification to a telephoto side when a movement amount of the image pickup apparatus detected after execution of the first zoom operation corresponds to a second amount which is smaller than the predetermined amount.

According to another embodiment of the present invention, an image pickup apparatus includes a movement detection unit configured to detect a movement of the image pickup apparatus, and a control unit configured to control a zoom operation. The control unit sets a first zoom magnification and performs a first zoom operation in which the zoom magnification is changed to a wide-angle side relative to the first zoom magnification when a movement amount of the image pickup apparatus corresponds to a first amount which is larger than a predetermined amount, and the control unit performs a second zoom operation in which the zoom magnification is changed to the set first zoom magnification when a movement amount of the image pickup apparatus detected after the first zoom operation is executed corresponds to a second amount which is smaller than the predetermined amount. The control unit changes the first zoom magnification in the next first zoom operation in accordance with a period of time from when the second zoom operation is performed to when the next first zoom operation is performed.

Further features of the present invention will become apparent from the following description of exemplary embodiments with reference to the attached drawings.

BRIEF DESCRIPTION OF THE DRAWINGS

FIGS. 6A to 6F are diagrams illustrating processes of preventing change of a size of a subject (person) in the screen.

FIGS. 7A and 7B form a flowchart illustrating an exemplary process of a FA zoom function.

FIGS. 15A to 15D are diagrams illustrating menu setting.

DESCRIPTION OF THE EMBODIMENTS

Embodiments of the present invention will be described in detail with reference to the accompanying drawings. Note that a framing assist (FA) zoom function for assisting framing executed by a user is described in one embodiment; the function is referred to as a "framing assist zoom function" (hereinafter simply referred to as an "FA zoom function").

Figure 1:
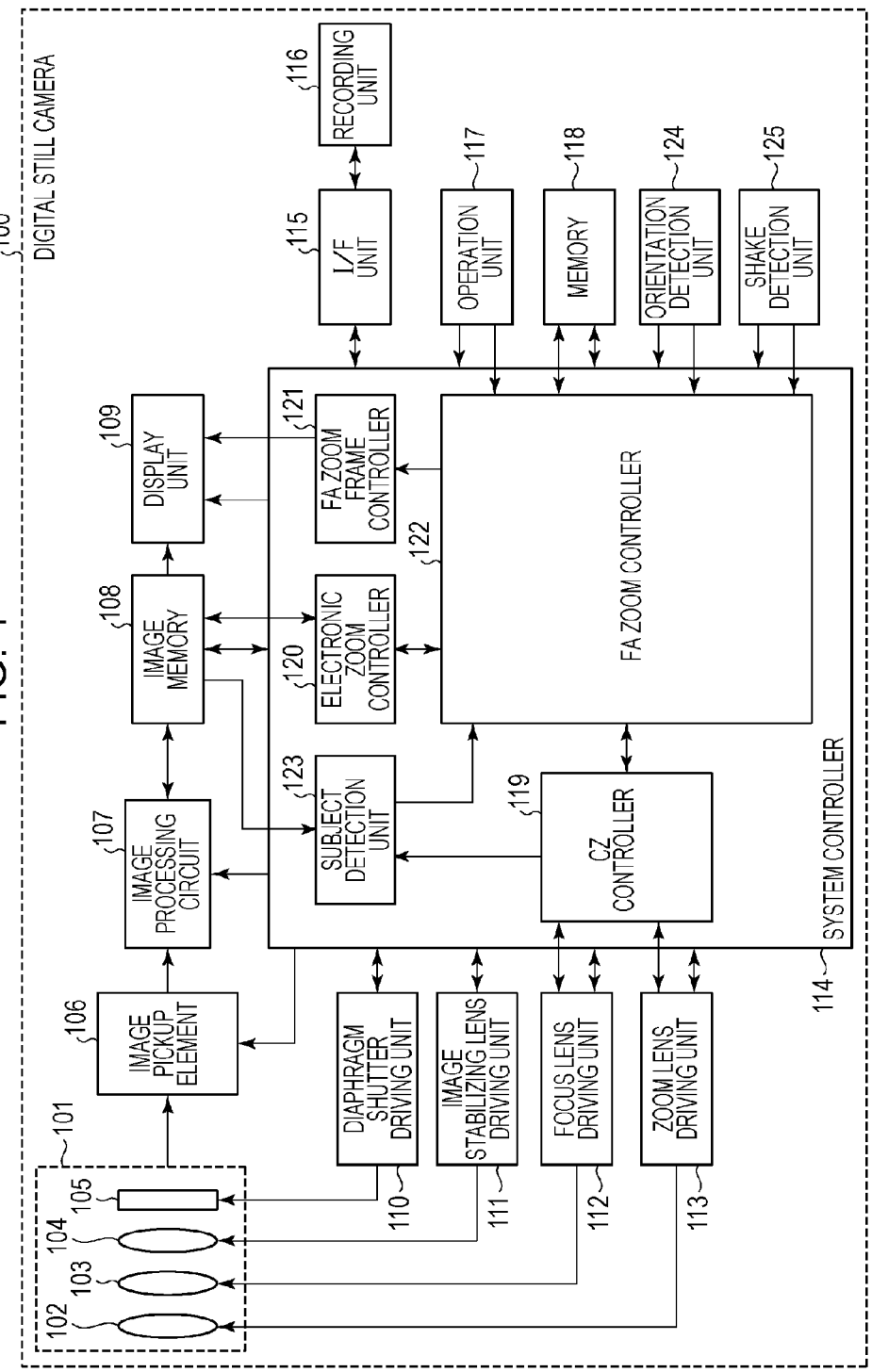
FIG. 1 is a block diagram illustrating a configuration of a digital still camera according to an embodiment of the present invention.

FIG. 1 is a block diagram illustrating a configuration of a digital still camera 100 which is an example of an image pickup apparatus of this embodiment. The digital still camera 100 is capable of executing the FA zoom function.

A lens barrel 101 includes a lens group therein. A zoom lens 102 controls a focal length by moving in an optical axis direction so as to optically change an angle of view (changes a zoom magnification). A focus lens 103 controls focus by moving in the optical axis direction. An image stabilizing lens 104 is used for correction of an image blur caused by camera shake. A diaphragm shutter 105 is capable of controlling light quantity and is used for exposure control. Although the digital still camera 100 illustrated in FIG. 1 includes the lens barrel 101 and a camera body which are integrally configured in this embodiment, the present invention is not limited to this. This embodiment is also applicable to an image pickup system including a camera body and an exchangeable lens which is detachable from the camera body. Similarly, although an embodiment is directed to a digital "still" camera, the present disclosure is not limited thereto as it is also applicable to cameras capable of shooting video and still images.

Light transmitted through the lens barrel 101 is received by an image pickup element 106 including a CCD (charge-coupled device) sensor or a CMOS (complementary metal-oxide semiconductor) sensor. The image pickup element 106 generates an image pickup signal by photoelectrically converting a subject image into an electric signal. The image pickup signal is supplied to an image processing circuit 107. The image processing circuit 107 performs various processes including a pixel interpolation process and a color conversion process on the input image pickup signal and outputs resultant image data (image data obtained after the various processes) to an image memory 108. The image memory 108 is a storage unit including a DRAM (dynamic random access memory) or a SRAM (static random access memory).

A display unit 109 includes a TFT LCD (thin-film transistor driving liquid crystal display device) and the like and displays a captured image (the image data). Furthermore, the display unit 109 displays specific information (including photographing information and an FA zoom frame described below, for example) with the captured image. An electronic viewfinder (EVF) function is realized for adjusting an angle of view by a photographer by information display such as a live view.

A diaphragm shutter driving unit 110 calculates an exposure control value (an aperture value and a shutter speed) in accordance with luminance information obtained by the image process performed by the image processing circuit 107 and drives the diaphragm shutter 105 in accordance with a result of the calculation. By this, AE (automatic exposure) control is performed. An image stabilizing lens driving unit 111 calculates an amount of shake applied to the digital still camera 100 in accordance with information on an angular velocity sensor, such as a gyro sensor, and drives the image stabilizing lens 104 such that the shake amount is cancelled (reduced).

A focus lens driving unit 112 drives the focus lens 103. In this embodiment, the digital still camera 100 performs AF (autofocus) control by a contrast detection method. Therefore, the focus lens driving unit 112 drives the focus lens 103 such that a subject is focused in accordance with focusing control information (a contrast evaluation value) of an image-pickup optical system obtained by the image process performed by the image processing circuit 107. However, this embodiment is not limited to this, and AF control employing a method other than the contrast detection method, such as a phase-difference AF method or AF control employing a plurality of methods, such as a combination of the contrast detection method and other methods, may be performed.

A zoom lens driving unit 113 drives the zoom lens 102 in accordance with a zoom operation instruction. An operation unit 117 includes a zoom lever, a zoom button, or the like serving as a zoom operation member used by the photographer to instruct the digital still camera 100 to perform zooming. A system controller 114 calculates a zoom driving speed and a driving direction in accordance with an operation amount and an operation direction of the zoom operation member used for the zoom instruction operation. In accordance with a result of the calculation, the zoom lens 102 is moved along an optical axis.

Image data generated by a photographing operation is supplied to and stored in a recording unit 116 through an interface unit (hereinafter simply referred to as an "I/F unit") 115. The image data is stored at least one of an external recording medium, such as a memory card, attached to the digital still camera 100 and a nonvolatile memory 118 incorporated in the digital still camera 100.

The operation unit 117 includes, in addition to the zoom operation member, a release switch for instructing start of photographing, an FA zoom operation switch for instructing start and end of the FA zoom function. The signal output from the operation unit 117 is supplied to the system controller 114 which will be described hereinafter. The memory 118 stores, in addition to program data and the image data, information on a setting of the digital still camera 100, information on zoom-in magnification of the FA zoom function which will be described hereinafter, and the like. Here, the zoom-in magnification serves as zoom returning magnification which is a target of zoom-in performed when FA zoom is terminated, and will be described in detail hereinafter.

The system controller 114 including a calculation device, such as a CPU (a central processing unit), controls the entire digital still camera 100 by transmitting a control instruction to various units in accordance with an operation of the photographer. The system controller 114 executes various control programs stored in the memory 118, such as programs for control of the image pickup element 106, AE/AF control, and zoom control (including an FA zoom process).

Next, control associated with the FA zoom function in the system controller 114 will be described. As illustrated in FIG. 1, the system controller 114 includes a CZ controller 119, an electronic zoom controller 120, an FA zoom frame controller 121, an FA zoom controller 122, and a subject detection unit 123.

Figure 2:
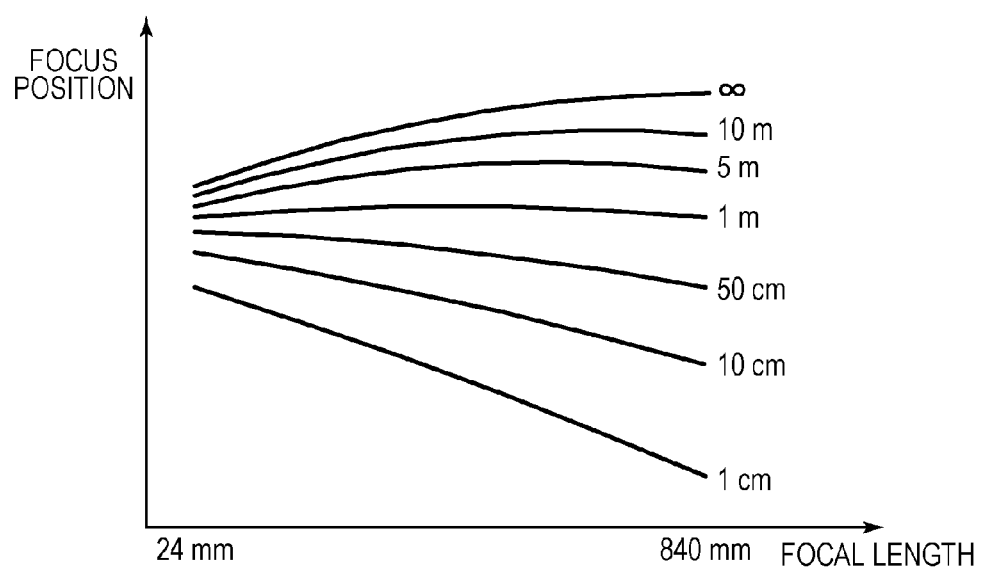
FIG. 2 is a diagram illustrating the relationship between a focal length and a position of a focus lens for each distance to a subject.

To maintain a focus state when an angle of view is changed by optical zoom, in a case of a rear focus type lens barrel, such as the lens barrel 101, the focus lens 103 is required to be moved to an appropriate focus position in accordance with a position of the zoom lens 102. This control is referred to as "computer zoom (CZ) control". FIG. 2 is a diagram illustrating the relationship between a focal length of the zoom lens 102 and a focus position depending on a subject distance. In FIG. 2, the relationships between the focal length of the zoom lens 102 and a focus position where focus is ensured are graphically represented as a data table for different distances to the subject. In this embodiment, the table is referred to as a "focus cam table". In FIG. 2, an axis of abscissa denotes a focal length corresponding to a zoom position and an axis of ordinate denotes a focus position. The distances between the digital still camera 100 and the subject (subject distances) are represented beside individual graph lines.

The system controller 114 instructs the focus lens driving unit 112 to move the focus lens 103 within a predetermined range when the AF control is performed so that a scanning operation is performed. Using a contrast evaluation value or the like obtained during the operation, a focus position which is a focal point is detected by a general method. A subject distance may be measured using a zoom position and the focus position at the time of the detection with reference to the focus cam table.

The digital still camera 100 has an optical zoom function and an electronic zoom function. The CZ controller 119 and the zoom lens driving unit 113 performs optical zoom. The CZ controller 119 detects a zoom position of the zoom lens 102 in a predetermined control cycle when a zoom operation is performed. Then the CZ controller 119 drives the focus lens 103 so as to follow the focus cam table in a subject distance measured by AF control corresponding to the zoom position. By this, an optical zoom operation may be performed while a focus state is maintained.

The electronic zoom controller 120 and the image memory 108 perform electronic zoom. The electronic zoom controller 120 realizes the electronic zoom function by extracting a target region from image data transferred to the image memory 108. Furthermore, the electronic zoom controller 120 displays a range extracted in a frame rate cycle of an image supplied to the image pickup element 106 in the display unit 109 while gradually increasing the range so as to realize smooth electronic zoom display. According to optical zoom and/or electronic zoom, an angle of view of a displayed image is changed.

The subject detection unit 123 detects a desired subject region from the image data stored in the image memory 108.

In this embodiment, a subject detection method for detecting a subject (a face or an object) in accordance with face information or color information included in image data will be described (a face detection process or a color detection process).

In a face detection process, a face region included in image data is detected in accordance with a general algorithm. The subject detection unit 123 extracts a feature value from a partial region of a square shape in image data and compares the feature value with a feature value of a face which is provided in advance, for example. When the correlation between the feature values exceeds a predetermined threshold value, the subject detection unit 123 determines that the partial region is a face region. This determination is repeatedly performed while a combination of a size, an arrangement position, and an arrangement angle of the partial region is changed so that various face regions included in the image data are detected.

In the color detection process, information on a color of the subject region designated by a subject designation method described below is stored as a feature color. The color detection process is executed when the subject to be detected is an object (an "object" other than persons). Examples of the color information include an RGB signal output from the image processing circuit 107, a luminance Y, and a color difference R-Y, B-Y, and the like. At a time of subject detection, the subject detection unit 123 divides the image data into a plurality of partial regions and calculates average values of luminance and color differences in the individual partial regions. Furthermore, the subject detection unit 123 compares the feature color information stored in advance and color information of the regions at the time of detection of the subject, and determines the partial regions which have a difference of the luminance and a difference of the color difference equal to or smaller than a predetermined amount as candidates of a subject region. An aggregate of partial regions adjacent to one another which are candidates of the subject region is determined as a same-color region, and a region having the same-color region having a size within a predetermined range is determined as a final subject region.

The subject detection unit 123 may estimate a size of the subject region on the image data by using, in addition to the face information and the color information, information on a subject distance measured by the CZ controller 119 and information on the focus distance of the zoom lens 102.

An orientation detection unit 124 detects an orientation (a normal position/a grip is positioned in an upper side/a grip is positioned in a lower side) of the digital still camera 100 in accordance with information on an acceleration sensor. A shake detection unit 125 detects a shake state of the digital still camera 100 in accordance with information on a gyro sensor (an angular velocity detection unit) or the like. The shake detection unit 125 determines whether panning has been performed by the digital still camera 100 in accordance with an amount of shake applied to the gyro sensor. The acceleration sensor and the gyro sensor used for the orientation detection and the shake detection, respectively, may serve as a sensor used as control information of the image stabilizing lens driving unit 111. Furthermore, the shake amount may be detected using the acceleration sensor used for the orientation detection. In this case, an angular velocity is calculated for the sake of convenience using acceleration rates of a plurality of axes.

Next, outline of the FA zoom function, the FA zoom frame controller 121, and the FA zoom controller 122 will be described. The digital still camera 100 of this embodiment has three modes including a manual search mode, an automatic tracking mode, and an automatic search mode as modes for executing FA zoom. In the manual search mode, when a subject moves out of a frame, a photographer operates an FA zoom operation switch so as to capture the subject again. In the automatic tracking mode, the digital still camera 100 automatically detects a subject and assists adjustment of an angle of view. In the automatic search mode, a movement of the digital still camera 100 is detected and a subject is automatically captured again. Hereinafter, outline of functions of the modes will be described.

In a case where a camera which does not have the FA zoom function is used, when a subject moves out of a frame after a photographer frames the subject in a telephoto state and waits shutter release opportunity, the photographer performs the following operation. Specifically, first, zoom-out is performed by operating a zoom operation member, and thereafter, a subject is searched for. After the subject is searched for, an angle of view is adjusted by performing a zoom operation until a desired angle of view is obtained again.

On the other hand, in a case where the digital still camera 100 having the manual search mode of the FA zoom function is used, when a subject is lost in a state in which adjustment of an angle of view is performed before photographing (hereinafter referred to as a "photographing preparation state"), the photographer operates the FA zoom operation switch. The FA zoom operation switch is assigned to the FA zoom function and is provided separately from the zoom operation member. Start of the FA zoom function is instructed to the digital still camera 100 by pressing the FA zoom operation switch. The FA zoom controller 122 stores zoom magnification of electronic zoom and optical zoom in the memory 118 in response to the FA zoom start instruction supplied from the FA zoom operation switch. Furthermore, the FA zoom controller 122 instructs the CZ controller 119 or the electronic zoom controller 120 to perform zoom-out in a wide-angle direction in accordance with a processing procedure described below so that an angle of view which is zoomed out relative to the photographing preparation state is obtained (hereinafter referred to as a "subject search state").

Figure 3A:
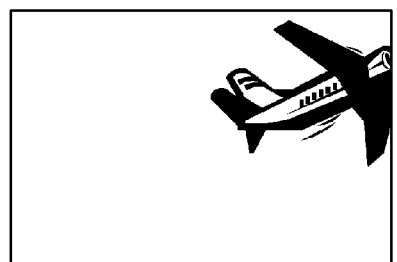
FIGS. 3A, 3B, 3C to 3D are diagrams illustrating angles of view in in a subject search state and angles of view in an image-pickup preparation state.

Next, angles of view in the photographing preparation state and the subject search state will be described with reference to FIGS. 3A to 3D. FIGS. 3A and 3D are diagrams illustrating angles of view in a zoom-in state (the photographing preparation state), and FIGS. 3B and 3C are diagrams illustrating angles of view in a zoom-out state (the subject search state).

As illustrated in FIG. 3A, when a subject (is about to) moves out of a frame, the photographer presses the FA zoom operation switch in the manual search mode described above so as to search for the subject. While the FA zoom operation switch is pressed, the zoom-out state is maintained and an FA zoom frame 300 representing an angle of view corresponding to zoom-in magnification is superposed on an image in the display unit 109.

Figure 3B:
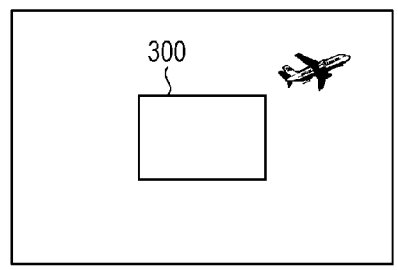
Figure 3C:
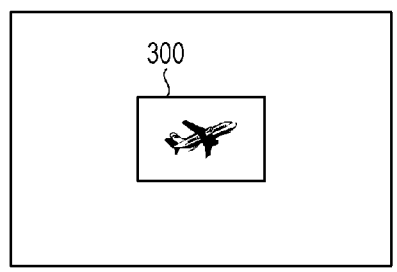
Figure 3D:
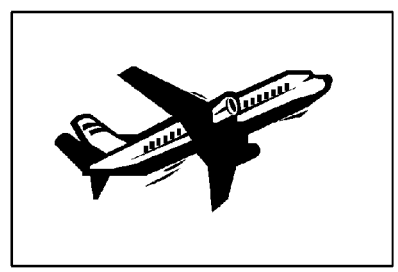

As illustrated in FIG. 3B, when the desired subject is found in the zoom-out state (the subject search state), the photographer performs framing such that the subject is included in the FA zoom frame 300 as illustrated in FIG. 3C. Thereafter, when the photographer releases the FA zoom operation switch, FA zoom termination is instructed to the FA zoom controller 122. Here, the FA zoom controller 122 performs a zoom-in operation by the electronic zoom or the optical zoom until stored zoom magnification (zoom-in magnification) in the photographing preparation state is reached. By this, an appropriate framing state as illustrated in FIG. 3D is obtained.

The FA zoom frame controller 121 calculates a size representing the stored angle of view in the photographing preparation state and displays the FA zoom frame 300 in the center of the EVF of the display unit 109 as illustrated in FIGS. 3B and 3C. The size of the FA zoom frame 300 is calculated on the basis of a zoom magnification at a time of the zoom-out. For example, when the subject search state is entered from the photographing preparation state by performing zoom-out in a twofold electronic zoom magnification and a threefold optical zoom magnification, an FA zoom frame of $\frac{1}{6}$ $(=(\frac{1}{2})\times(\frac{1}{3}))$ of an angle of view displayed in the EVF in the subject search state is displayed. In this way, using the manual search mode, the photographer may cause a subject to put in a frame again which was out of frame by a simple operation while photographing is performed with a desired angle of view.

Furthermore, in a case where a scene in which a subject is likely to be out of a frame such as a case where a moving subject is to be captured, when a mode in which a camera automatically changes zoom magnification is entered, frame-out may be more easily prevented and the subject which has moved out of frame may be more easily captured again. Here, the automatic tracking mode and the automatic search mode correspond to a mode in which a camera automatically changes zoom magnification in this embodiment. In particular, when photographing is performed in a telephoto state, since an angle of view is narrow, a subject is likely to be out of a frame even by a small movement of the camera caused by a hand shake or the like.

The digital still camera 100 of this embodiment has the automatic tracking mode of the FA zoom function. When the automatic tracking mode is used, a subject to be captured is designated by performing an operation of designating a subject using a touch panel or the like after the automatic tracking mode is set. As a method for designating a subject, instead of the operation of a touch panel, a method for designating a subject located in a portion in the vicinity of the center when a certain button is pressed, a method for automatically selecting a main subject from among subjects detected by a camera, or the like may be used.

The subject detection unit 123 calculates a position and a size of a subject region designated by the image memory 108 on image data. When this operation is consecutively performed on the image data for every sampling to be displayed as a live view, a movement of the subject may be tracked. When the tracked subject is detected in a zoom-out region described below or when the subject is larger than a predetermined size, the FA zoom controller 122 instructs the CZ controller 119 or the electronic zoom controller 120 to perform zoom-out in the wide-angle direction. When the subject is detected in a zoom-in region included in the FA zoom frame 300, and in addition, when the subject has a size within the predetermined size, a zoom-in operation is performed to zoom magnification in a telephoto direction represented by the FA zoom frame 300.

By this process, in the automatic tracking mode, the photographer moves a camera such that a subject is included in a screen without concern for a zoom operation. Even if a subject is about to be out of a frame, zoom magnification is automatically changed, and accordingly, adjustment of an angle of view may be more easily performed.

The digital still camera 100 of this embodiment further has the automatic search mode of the FA zoom function. The automatic search mode is executed when the subject is not detected during the automatic tracking mode. In the automatic search mode, the shake detection unit 125 detects a movement of the digital still camera 100, and when the digital still camera 100 is considerably moved, the FA zoom controller 122 instructs the CZ controller 119 or the electronic zoom controller 120 to perform zoom-out in the wide-angle direction. Thereafter, when the movement of the digital still camera 100 is stopped, the FA zoom controller 122 performs a zoom-in operation in a telephoto direction.

By this process, in the automatic search mode, the photographer moves the digital still camera 100 without performing a zoom operation when a subject becomes out of a frame. Even when the subject moves out of a frame, zoom magnification is automatically changed, and accordingly, the subject is captured again with ease and an angle of view may be immediately returned to an original angle of view after the subject is captured again. Furthermore, when the automatic tracking mode and the automatic search mode are performed at appropriate timings, the photographer may perform framing with ease.

Figures 4A, 4B:
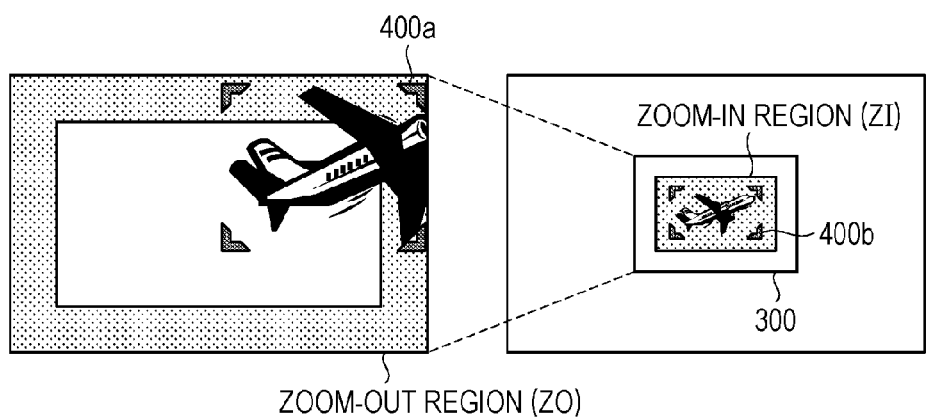
FIGS. 4A and 4B are diagrams illustrating a process of preventing the subject (object) from being framed-out of a field-of-view as observed in a screen.
Figure 5A:
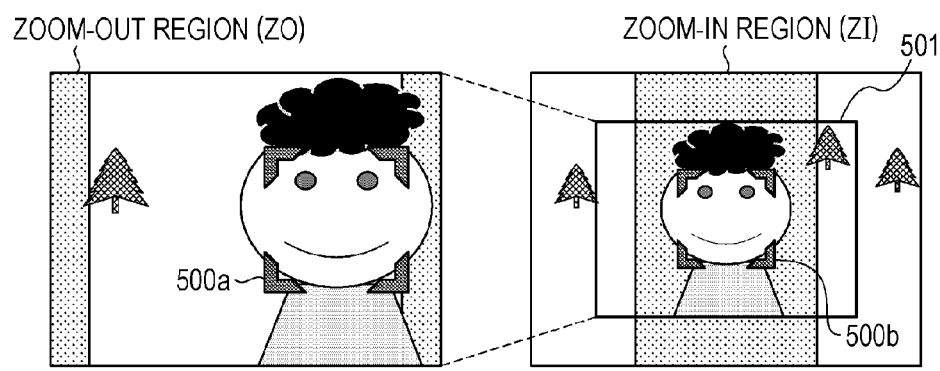
FIGS. 5A to 5C are diagrams illustrating processes of preventing a subject (person) from being framed-out of a screen.
Figure 5B:
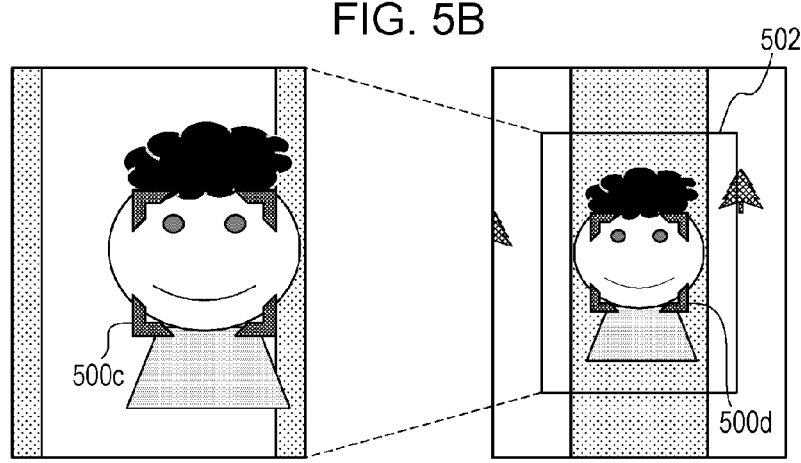
Figure 5C:
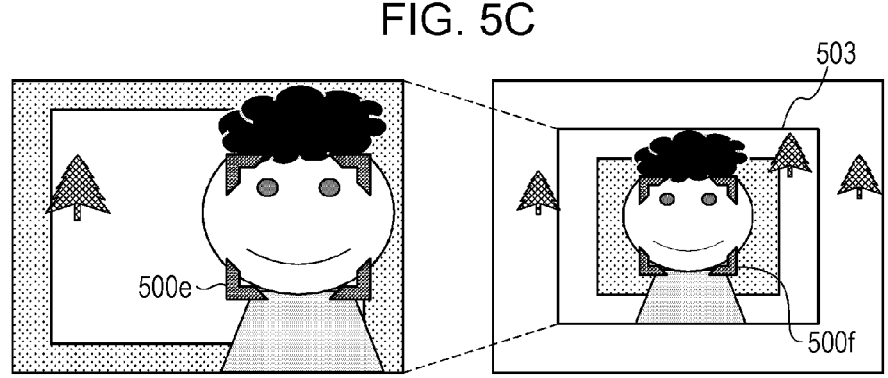

Next, conditions for starting the zoom-out operation and the zoom-in operation in the automatic tracking mode will be described with reference to FIGS. 4A and 4B, FIGS. 5A to 5C, and FIGS. 6A to 6F. FIGS. 4A and 4B are explanatory diagrams illustrating a process of preventing a subject (an object) from being out of a frame. FIGS. 5A to 5C are explanatory diagrams illustrating a process of preventing a subject (a person) from being out of a frame.

In FIGS. 4A and 4B and FIGS. 5A to 5C, a reference numeral 400 (400a and 400b) denotes an object tracking frame for tracking a subject (an object other than persons) and a reference numeral 500 (500a to 500f) denotes a face tracking frame for tracking a subject (a face of a person). In this embodiment, when a tracking frame is applicable to both a person and an object serving as subjects, the object tracking frame 400 and the face tracking frame 500 may be collectively referred to as a "subject tracking frame". The subject tracking frame is displayed so as to surround a subject on the EVF of the display unit 109 so that the subject designated by the photographer is specified. A position and a size of the subject tracking frame in the screen are calculated by the subject detection unit 123 on the basis of the face information and the color information and updated in a frame-rate cycle.

FIGS. 4A and 4B are diagrams illustrating a process of preventing a subject (an air plane) from being out of a frame, and FIG. 4A is a diagram illustrating a zoom-out region ZO which is a region outside a region having a predetermined ratio in the entire angle of view (the entire screen) displayed in the EVF. For example, assuming that a center point of the screen is 0% and the entire screen is 100%, in a case where an angle of view of 80% of the entire screen is set as a boundary of the zoom-out region ZO, a region of 80% to 100% of the entire screen is set as the zoom-out region ZO. When a portion of the object tracking frame 400a intrudes into the zoom-out region ZO in an image, a zoom-out operation is started. Furthermore, zoom magnification before the zoom-out operation (corresponding to a zoom-in angle of view) is stored in the memory 118. A zoom magnification and a zoom speed in the zoom-out operation are set in advance in accordance with a size and a moving speed of a subject. Alternatively, the zoom magnification and the zoom speed may be appropriately calculated in accordance with a size and a moving speed of a subject. The zoom-out operation is executed in accordance with the magnification and the zoom speed. By this, frame-out of a subject may be efficiently prevented.

FIG. 4B is a diagram illustrating an angle of view when the zoom-out is performed by a predetermined zoom changing amount from the angle of view of FIG. 4A. In FIG. 4B, a region inside a portion of a predetermined ratio in a zoom-in angle of view represented by the FA zoom frame 300 in the subject search state is represented as a zoom-in region ZI. For example, assuming that the center point of the screen is 0% and the FA zoom frame 300 (the zoom-in angle of view) is 100%, in a case where an angle of view of 70% of the zoom-in angle of view is set as a boundary of the zoom-in region ZI, a region of 0% to 70% of the FA zoom frame 300 is set as the zoom-in region ZI. When a zoom-out magnification is ½, for example, a size of the FA zoom frame 300 is 50% of the entire screen. Accordingly, the zoom-in region ZI is a region of 0 to 35% (=70%×(½)) of the entire screen. When the photographer changes a direction of the digital still camera 100 such that the object tracking frame 400b is included in the zoom-in region ZI, the zoom-in operation is started.

FIG. 5A to FIG. 5C are explanatory diagrams illustrating a process of preventing a subject (a person) from being out of a frame. Also when a subject is a person, the zoom-out operation is started when a portion of the face tracking frame 500 is included in the zoom-out region ZO and the zoom-in operation is performed when the face tracking frame 500 is included in the zoom-in region ZI. A difference between a case where a subject is a person and a case where a subject is an object is that a moving direction may be estimated to some extent when a subject is a person, and accordingly, the zoom-out region ZO and the zoom-in region ZI are set only in a region in the estimated moving direction.

Furthermore, when photographing is performed while the digital still camera 100 is held by a hand, a subject may move out of a frame due to camera shake. However, when a subject moves out of a frame due to camera shake, the photographer performs an operation of causing the subject to be in a frame so that the subject is included in a frame again. Here, in a case where the zoom-out region ZO is set in an upper portion of the screen, the face tracking frame 500 may be included in the zoom-out region ZO even when a person located in the vicinity of the center is to be captured, and accordingly, zoom-out may be unexpectedly performed. Therefore, when a subject is a person and when the digital still camera 100 is held by a hand, the zoom-out region ZO is not set in the upper portion of the screen taking a framing operation performed by the photographer into consideration.

By this, in this embodiment, when the subject detection unit 123 detects a face, the zoom-out region ZO and the zoom-in region ZI are dynamically changed in accordance with an orientation of the digital still camera 100 detected by the orientation detection unit 124 and a result of detection performed by the shake detection unit 125. The result of detection performed by the shake detection unit 125 means a result of a determination as to whether the digital still camera 100 is held by a hand.

FIG. 5A is a diagram illustrating the zoom-out region ZO and the zoom-in region ZI set when the digital still camera 100 is held by a hand in a normal position. In such a photographing scene, when a subject moves in a horizontal direction and moves out of a frame, a position of the subject in the screen is moved in the horizontal direction (a longitudinal direction) relative to the screen in a normal position. Therefore, as illustrated in FIG. 5A, the zoom-out region ZO and the zoom-in region ZI are disposed as vertical bands in a vertical direction (a shorter side direction) relative to the screen in the normal position. When the face tracking frame 500a intrudes into the zoom-out region ZO, it is determined that zoom-out is started and the zoom-out is performed by a predetermined zoom magnification. Furthermore, when the face tracking frame 500*b* is included in the zoom-in region ZI, it is determined that zoom-in is started and the zoom-in is performed by a predetermined zoom magnification until zoom returning magnification (an angle of view 501) is reached. As described above, since the zoom-out region ZO and the zoom-in region ZI are set, frame-out may be efficiently prevented.

FIG. 5B is a diagram illustrating the zoom-out region ZO and the zoom-in region ZI set when the digital still camera 100 is set in a vertical position in which a grip is positioned in an upper side or a lower side in the same photographing scene. In this case, the zoom-out region ZO and the zoom-in region ZI are disposed as vertical bands in a vertical direction (a longitudinal direction) relative to the screen in the vertical position. When the face tracking frame 500*c* intrudes into the zoom-out region ZO, it is determined that zoom-out is started and the zoom-out is performed by a predetermined zoom-out magnification. Furthermore, when the face tracking frame 500*d* is included in the zoom-in region ZI, it is determined that zoom-in is started and the zoom-in is performed by a predetermined zoom magnification until zoom returning magnification (an angle of view 502) is reached. Since the zoom-out region ZO and the zoom-in region ZI are set in this way, a movement of a subject in a horizontal direction may be detected and frame-out may be efficiently prevented.

FIG. 5C is a diagram illustrating the zoom-out region ZO and the zoom-in region ZI set when a detection state of the shake detection unit 125 is a fixed state. When the digital still camera 100 is fixed by a tripod or the like, frame-out may not occur due to camera shake. Furthermore, when zoom-in is performed in a state in which a subject is not included in a portion in the vicinity of the center of the screen, the subject may be out of a frame due to the zoom-in operation. Accordingly, the zoom-out region ZO is set in an entire peripheral portion of the screen and the zoom-in region ZI is set in a portion inside a zoom-in angle of view. When the face tracking frame 500*e* intrudes into the zoom-out region ZO, it is determined that zoom-out is started and the zoom-out is performed by a predetermined zoom magnification. Furthermore, when the face tracking frame 500*f* is included in the zoom-in region ZI, it is determined that zoom-in is started and the zoom-in is performed by a predetermined zoom magnification until zoom returning magnification (an angle of view 503) is reached.

As described above, since the zoom-out region ZO and the zoom-in region ZI are dynamically changed in accordance with change of an orientation of the digital still camera 100 and a photographing state (a hand-hold state/a fixed state), a subject is efficiently prevented from being out of a frame while preventing an error operation due to camera shake or the like. The zoom-out region ZO or the zoom-in region ZI may be changed in accordance with one of the orientation of the digital still camera 100 and the photographing state (the hand-hold state/the fixed state). Alternatively, only one of the zoom-out region ZO and the zoom-in region ZI may be changed.

FIGS. 6A to 6C are diagrams illustrating a case where a zoom operation is performed such that the digital still camera 100 automatically sets a ratio of a subject which occupies the screen within a predetermined ratio when a person serving as the subject moves toward the digital still camera 100. A face tracking frame 600 (600*a* to 600*f*) is displayed so as to surround a face region as a feature region of the person serving as the subject. Therefore, it is assumed that a size of the face tracking frame 600 is equal to a size of the subject in this embodiment.

FIG. 6A is a diagram illustrating an angle of view obtained when the subject is designated in accordance with a subject designation method described below. A size of the face tracking frame 600*a* at a time of designation of the subject is stored in the memory 118 as a reference subject size (a reference size).

FIG. 6B is a diagram illustrating an angle of view obtained when the subject moves toward the digital still camera 100 in a state in which zoom magnification is not changed from the state of FIG. 6A. For example, 150% of a size of the face tracking frame 600*a* serving as the reference subject size is determined as a zoom-out operation start size. When the face tracking frame 600*b* becomes larger than 150% of the face tracking frame 600*a*, the FA zoom controller 122 determines that the zoom-out operation is to be started.

FIG. 6C is a diagram illustrating an angle of view obtained when zoom-out is performed by a predetermined zoom magnification from an angle of view 601 of FIG. 6B and the face tracking frame 600*c*. Here, the predetermined zoom magnification is 1/1.5 taking a change rate (150%) from the reference subject size of the face tracking frame size at the time when the zoom-out operation is started into consideration. Thereafter, when the subject further moves toward the digital still camera 100, the subject may be included within a region of a predetermined ratio by performing zoom-out in a wide-angle direction. Therefore, the photographer may concentrate on an operation of the release switch.

On the other hand, FIGS. 6D to 6F are diagrams illustrating a case where a zoom operation is performed such that the digital still camera 100 automatically sets a ratio of a subject which occupies the screen within a predetermined ratio when the person serving as the subject moves away from the digital still camera 100.

FIG. 6D is a diagram illustrating an angle of view obtained when the subject is designated in accordance with the subject designation method described below. A size of a face tracking frame 600*d* at a time of designation of the subject is stored in the memory 118 as a reference subject size.

FIG. 6E is a diagram illustrating an angle of view obtained when the subject moves away from the digital still camera 100 in a state in which zoom magnification is not changed from the state of FIG. 6D. For example, 50% of a size of the face tracking frame 600*d* serving as the reference subject size is determined as a zoom-in operation start size. When the face tracking frame 600*e* becomes smaller than 50% of the face tracking frame 600*d* and the face tracking frame 600*e* is included in the zoom-in region ZI, the FA zoom controller 122 determines that the zoom-in operation is started. Here, the zoom-in region ZI is set inside the angle of view 602 obtained by performing zoom-in by a predetermined zoom magnification on an angle of view of FIG. 6E.

FIG. 6F is a diagram illustrating an angle of view obtained by performing zoom-in by a predetermined zoom magnification from the angle of view of FIG. 6E and the face tracking frame 600*f*. Here, the predetermined zoom magnification is 1/0.5 taking a change rate (50%) from the reference subject size of the face tracking frame size at the time when the zoom-in operation is started into consideration.

In FIGS. 4A and 4B and FIGS. 5A to 5C, the process of preventing a subject which is an object or a person from being out of a frame has been described. Furthermore, in FIGS. 6A to 6F, a process of setting a size of a subject within a predetermined ratio when the subject is a person has been described. Note that, in a case where a subject to be tracked is an object, as with the case where a subject is a person, a zoom operation start determination may be performed for a subject size maintaining control illustrated in FIGS. 6A to 6F.

Figure 8:
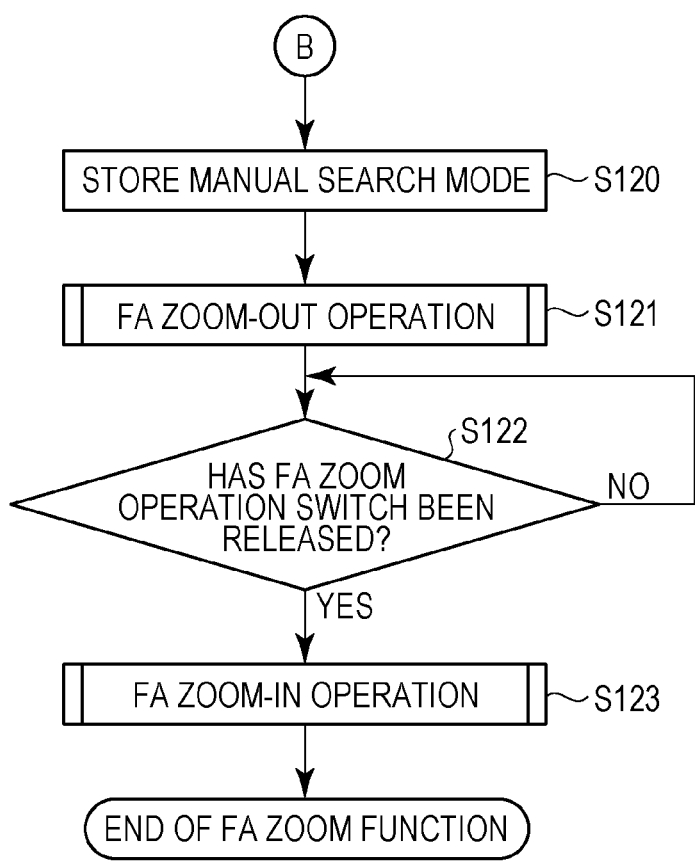
FIG. 8 is a flowchart illustrating an additional process of the FA zoom function illustrated in FIGS. 7A and 7B.
Figure 9:
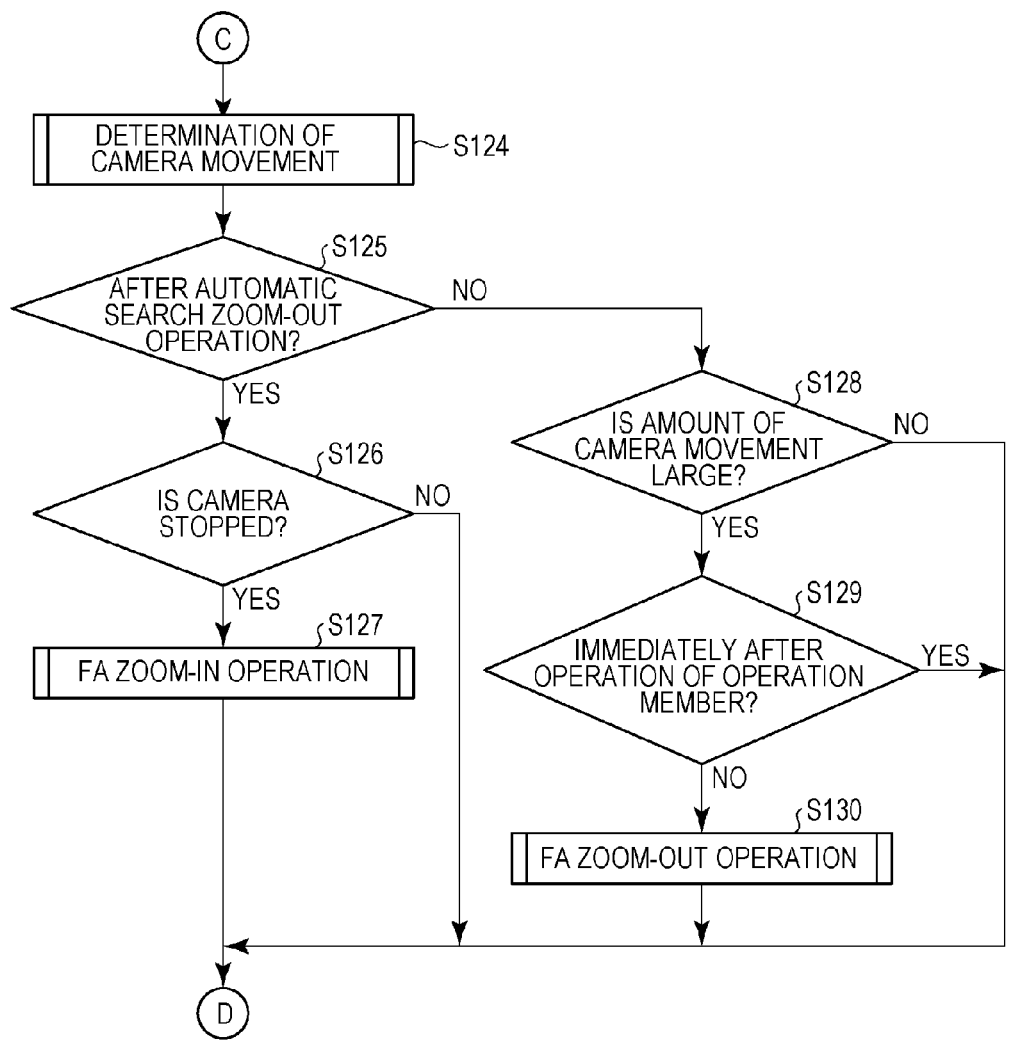
FIG. 9 is a flowchart illustrating an additional process of the FA zoom function illustrated FIGS. 7A and 7B.

Next, a process of the FA zoom function will be described with reference to FIGS. 7 to 14. FIGS. 7 to 9 are a flowchart illustrating the entire process of the FA zoom function. The FA zoom function of FIGS. 7 to 9 is performed under control of the FA zoom controller 122 unless otherwise described.

First, in step S100, the FA zoom controller 122 determines whether the FA zoom operation switch of the operation unit 117 has been pressed. When the FA zoom operation switch has been pressed, the process proceeds to step S101 where the FA zoom controller 122 measures a period of time in which the FA zoom operation switch is pressed.

In step S101, the FA zoom controller 122 determines whether the FA zoom operation switch has been released within a predetermined period of time after the FA zoom operation switch is pressed. Specifically, the FA zoom controller 122 determines a long-time depression or a short-time depression of the FA zoom operation switch and selects a mode to be executed depending on the depression time. In a case of the long-time depression of the FA zoom operation switch, the process proceeds to step S120 of FIG. 8 where the FA zoom controller 122 selects the manual search mode and stores the selected mode in the memory 118. On the other hand, in a case of the short-time depression of the FA zoom operation switch, the process proceeds to step S102 where the FA zoom controller 122 selects the automatic tracking mode (a first mode) and stores the selected mode in the memory 118.

When the manual search mode is stored in step S120, the FA zoom controller 122 performs an FA zoom-out operation described below with reference to FIG. 11A in step S121. After the FA zoom-out operation is terminated, the process proceeds to step S122.

In step S122, the FA zoom controller 122 determines whether the long-time depression of the FA zoom operation switch has been released. When the FA zoom operation switch is released, it is determined that the FA zoom is terminated. Specifically, the FA zoom controller 122 continues the framing assist zoom while the operation unit 117 is pressed (operated) in the manual search mode. After the press of the operation unit 117 is terminated, the process proceeds to step S123. In step S123, the FA zoom controller 122 instructs the CZ controller 119 or the electronic zoom controller 120 to perform zooming until the stored optical zoom magnification and the stored electronic zoom magnification (the zoom-in magnification) is reached so that the FA zoom-in operation described hereinafter with reference to FIG. 11B is performed. By this, the FA zoom function in the manual search mode is terminated.

On the other hand, when the automatic tracking mode is selected, after the automatic tracking mode is stored in the memory 118 in step S102, a subject designation process is performed in step S103.

Figure 10A:
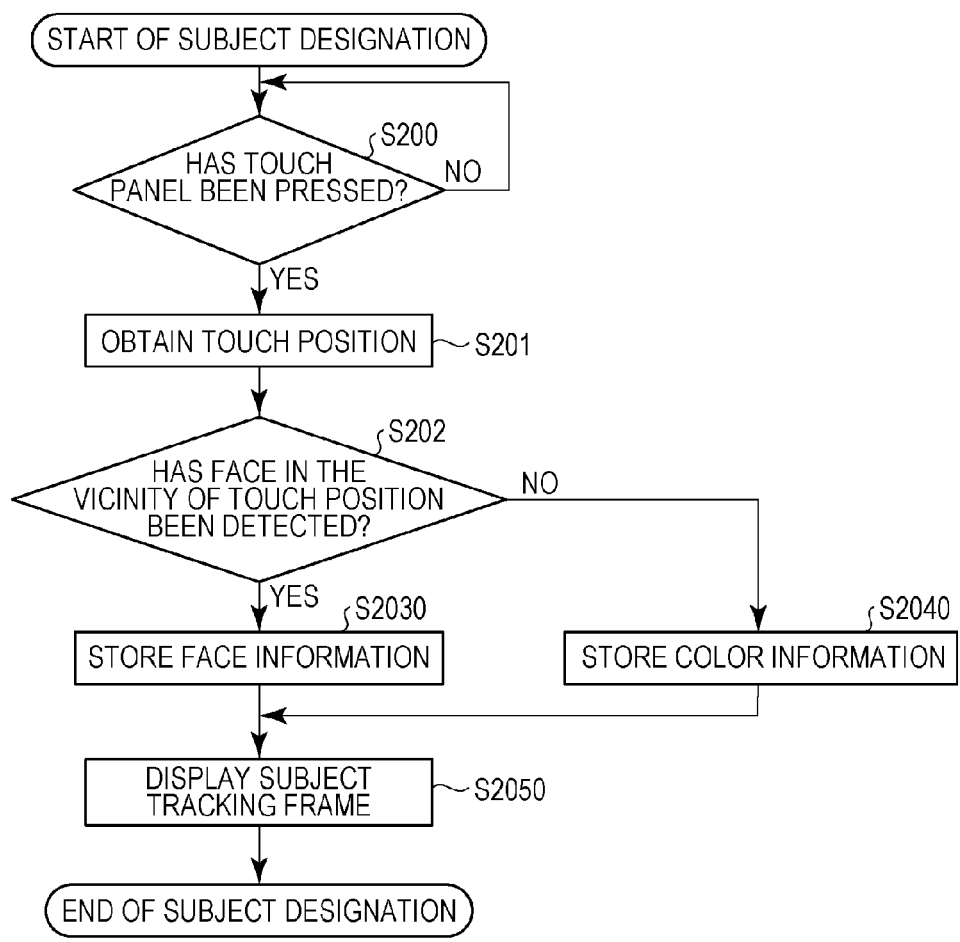
FIGS. 10A, 10B and 10C are flowcharts illustrating alternative examples of implementing a subject designation process.

The subject designation process in step S103 will now be described with reference to FIGS. 10A to 10C. FIG. 10A is a flowchart illustrating an operation of designating a subject displayed in the display unit 109 by touching the subject using a touch panel which is a member of the operation unit 117. In step S200, the FA zoom controller 122 determines whether the touch panel has been pressed. When the touch panel is pressed, the process proceeds to step S201 where the FA zoom controller 122 obtains information on a touched position (a touch position).

Subsequently, in step S202, the FA zoom controller 122 notifies the subject detection unit 123 of the touch position, and the subject detection unit 123 performs face detection in a portion in the vicinity of the touch position. When a face is detected in the portion in the vicinity of the touch position, it is determined that a main subject is a person and the process proceeds to step S2030. In step S2030, the FA zoom controller 122 stores information on the face of the person which is a target of automatic tracking in the memory 118. Specifically, examples of the face information include a size of the face, a detection position of the face, and a direction of the face at a time of the subject designation. Cameras having a face authentication function store authentication IDs and the like.

On the other hand, when a face is not detected in the portion in the vicinity of the touch position in step S202, it is determined that the main subject is not a person but an object, and the process proceeds to step S2040. In step S2040, the FA zoom controller 122 stores a feature color in the portion in the vicinity of the touch position in the memory 118 as color information of the target of the automatic tracking. Specifically, examples of the color information include a color, luminance, a value of a color difference, a size of the same color region, and a center-of-gravity position of the same color region at the time of the subject designation. The face information and the color information are collectively referred to as subject information (including a subject size and a subject detection position) hereinafter.

After the subject information is stored in step S2030 or step S2040, the process proceeds to step S2050. In step S2050, the FA zoom controller 122 displays a subject tracking frame (the object tracking frame 400 or the face tracking frame 500) having a size corresponding to a size of the subject while the subject detection position is set in the center in the display unit 109. The subject designation process is thus terminated.

In the automatic tracking mode, the system controller 114 (the subject detection unit 123) detects a subject in a position specified by the photographer or a portion in the vicinity of the position specified by the photographer in the display unit 109. The system controller 114 (the FA zoom controller 122) displays the subject tracking frame in the display unit 109. According to the flowchart of FIG. 10A, a subject desired to be tracked by the photographer may be easily designated by an instinctive designation method.

Figure 10B:
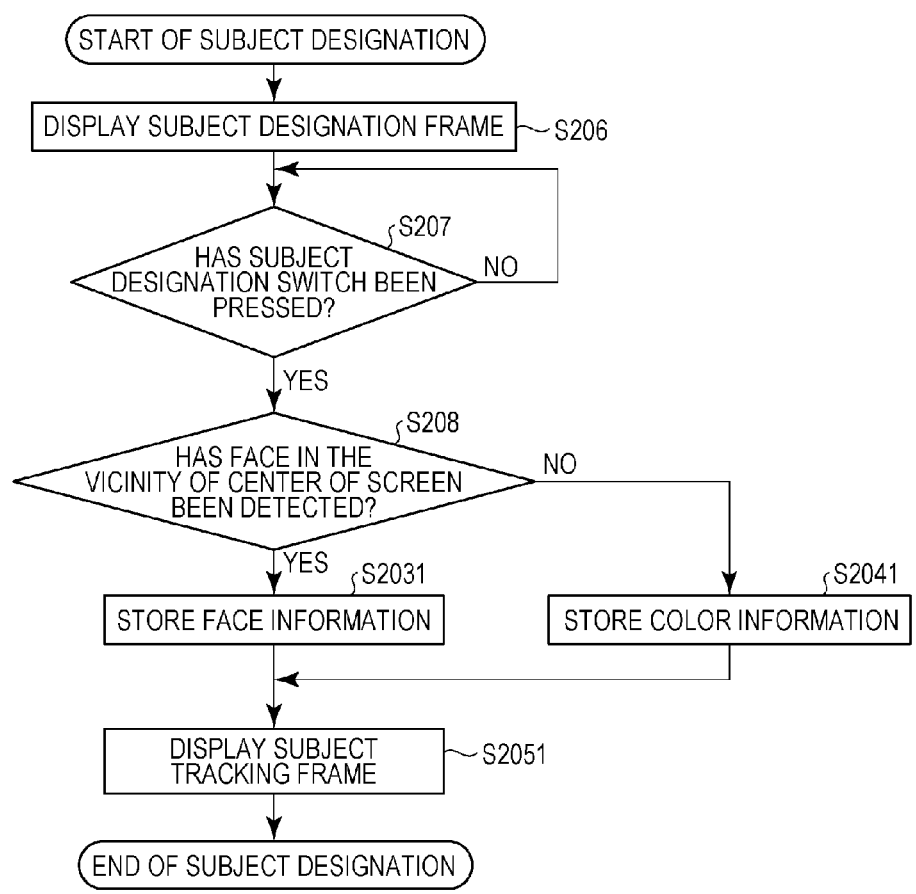

FIG. 10B is a flowchart illustrating an operation of designating a subject by a switch (a subject designation switch) other than the FA zoom operation switch which is a member included in the operation unit 117. First, in step S206, the FA zoom controller 122 displays a frame serving as a guide of the subject designation in a portion in the vicinity of the center of the screen of the display unit 109. The photographer controls a direction of the digital still camera 100 such that a subject to be tracked is included in an approximately center position using the frame as a guide. Subsequently, in step S207, the FA zoom controller 122 determines whether the subject designation switch has been pressed. When the subject designation switch has been pressed, the process proceeds to step S208.

In step S208, the subject detection unit 123 performs face detection in a portion in the vicinity of the center of the screen. When a face is detected in the portion in the vicinity of the center of the screen, it is determined that a main subject is a person and the process proceeds to step S2031. On the other hand, when a face is not detected in the portion in the vicinity of the center of the screen, it is determined that the main subject is not a person but an object and the process proceeds to step S2041. After information on the subject is stored in step S2031 or step S2041, the process proceeds to step S2051. In step S2051, the subject tracking frame (the object tracking frame 400 or the face tracking frame 500) is displayed, and the subject designation process is terminated. The basic operations in step S2031, step S2041, and step S2051 of FIG. 10B are the same as those in step S2030, step S2040, and step S2050 of FIG. 10A, respectively.

In the automatic tracking mode, the system controller 114 (the subject detection unit 123) detects a subject in the center position of the screen of the display unit 109 or the portion in the vicinity of the center position of the screen. The system controller 114 (the FA zoom controller 122) displays the subject tracking frame representing a position of the subject in the display unit 109. According to the flowchart of FIG. 10B, even in a camera which does not have an operation member such as a touch panel, a subject may be easily designated.

Figure 10C:
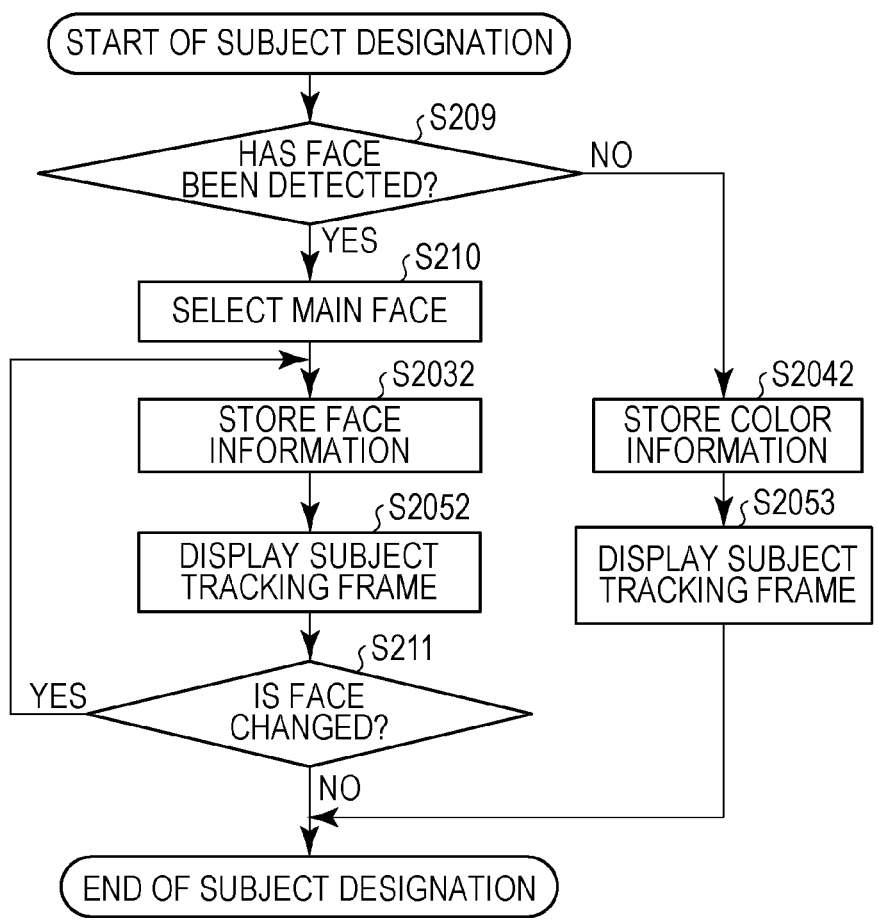

FIG. 10C is a flowchart illustrating an operation of automatically selecting a subject to be tracked from among faces detected when the FA zoom operation switch which is a member included in the operation unit 117 is pressed for a short period of time. First, in step S209, the subject detection unit 123 performs face detection on the entire screen. When at least one face of a person is detected in the entire screen, it is determined that a main subject is a person and the process proceeds to step S210. In step S210, when only one face of a person is detected, the subject detection unit 123 determines that the face is a main face. When a plurality of faces are detected, the subject detection unit 123 selects one of the faces as a main face serving as a subject to be tracked. As a determination criterion for selection of a main face, a method for selecting a face positioned in the vicinity of the center of the screen when face detection is performed is employed, for example. Furthermore, in a case where a plurality of faces are detected in similar positions, a method for selecting one of the faces having the largest size may be employed. Moreover, in a case of a camera having a face authentication function, if a face which has been authenticated and registered is included in the plurality of detected faces, a method for preferentially determining the authenticated and registered face as a main face may be employed. In step S2032, the FA zoom controller 122 stores information on the selected main face in the memory 118. After the face information is stored in step S2032, the process proceeds to step S2052 where the FA zoom controller 122 displays the face tracking frame 500.

Subsequently, in step S211, when a main face automatically selected from among a plurality of faces is not desired by the photographer, the photographer may change the main face. Here, when a switch (the FA zoom operation switch or other switches) of the operation unit 117 is pressed, a face which has not been selected as a main face from among the faces in which the face tracking frame 500 is detected is set as a main face. When the main face is changed, the process returns to step S2032 where the FA zoom controller 122 updates the stored face information. Furthermore, in step S2052, a size and a detection position of the face tracking frame 500 are changed to a size and a detection position of the newly selected main face.

On the other hand, when a face is not detected in the entire screen in step S209, it is determined that the main subject is not a person but an object, and the process proceeds to step S2042. In step S2042, the FA zoom controller 122 stores a feature color in the portion in the vicinity of the center of the screen in the memory 118 as color information of the target of the automatic tracking. After the object information is stored in step S2042, the process proceeds to step S2053 where the face tracking frame 400 is displayed. The subject designation process is thus terminated. The basic operations in step S2032, step S2042, and step S2052 (S2053) of FIG. 10C are the same as those in step S2030, step S2040, and step S2050 of FIG. 10A, respectively.

As described above, in the automatic tracking mode, the system controller 114 (the subject detection unit 123) performs face detection in the entire screen of the display unit 109. When a plurality of faces are detected, the system controller 114 (the FA zoom controller 122) displays a subject tracking frame representing a position of a first face selected from among the plurality of faces as a subject. Furthermore, when the first face serving as a subject is replaced by a second face, the system controller 114 (the FA zoom controller 122) displays a subject tracking frame representing a position of the second face in the display unit 109. According to the flowchart of FIG. 10C, a subject may be easily designated by a smaller number of operations.

After the subject designation process illustrated in FIGS. 10A to 10C is terminated, the process proceeds to step S104 of FIG. 7A. In the process from step S104, the FA zoom controller 122 determines whether an FA zoom operation is to be started in accordance with reference subject information obtained in the subject designation and subject information periodically detected. This determination is repeatedly performed in a predetermined control cycle until a condition for start of FA zoom is satisfied.

In step S104, the subject detection unit 123 determines whether a subject having a feature the same as that of the reference subject information, that is, a face when a reference subject is a person or the same feature color when the reference subject is an object, has been detected in the entire screen. If a subject to be tracked is not detected, the process proceeds to step S124 of FIG. 9. On the other hand, if the subject to be tracked is detected, the process proceeds to step S105. Note that, as a determination method in step S104, when a predetermined period of time has been elapsed in a state in which the subject detection unit 123 does not detect a subject or when the number of times a subject is not detected reaches a predetermined value, the process may proceed to step S124.

The determinations in step S105, step S112, and step S113 correspond to the determination for start of the FA zoom for preventing a subject from being out of frame (for frame-out prevention control). In step S105, the FA zoom controller 122 determines whether the subject tracking frame of the tracked subject has intruded into the zoom-out region ZO. When it is determined that the tracking frame has intruded into the zoom-out region ZO in step S105, that is, when it is highly likely that the subject moves out of a frame, the process proceeds to step S106 where an FA zoom-out operation described below is started. The FA zoom-out operation here corresponds to a zoom-out operation for the frame-out prevention control.

On the other hand, when it is determined that the subject tracking frame has not intruded into the zoom-out region ZO in step S105, that is, the subject is captured in a portion in the vicinity of the center of the screen, the process proceeds to step S112. In step S112, it is determined whether a preceding zoom operation is a zoom-out operation performed due to intrusion of the tracking frame into the zoom-out region ZO in step S105, that is, the zoom-out operation for the frame-out prevention control. When the determination is affirmative, the process proceeds to step S113.

In step S113, the FA zoom controller 122 determines whether the subject tracking frame of the tracked subject is included (incorporated) in the zoom-in region ZI. The zoom-in region ZI here corresponds to the zoom-in region ZI described with reference to FIG. 4B and FIGS. 5A to 5C. When it is determined that the tracking frame (the subject) is not included in the zoom-in region ZI in step S113, the process proceeds to step S107. On the other hand, when the tracking frame is included in the zoom-in region ZI, that is, when the subject is captured in the portion in the vicinity of the center of the screen and has a size within an angle of view corresponding to the zoom returning magnification, the process proceeds to step S114 where an FA zoom-in operation described below is started. The FA zoom-in operation corresponds to a zoom-in operation for the frame-out prevention control.

In this embodiment, first, the subject is set in the portion in the vicinity of the center of the screen by the frame-out prevention control, and thereafter, size maintaining control is set executable so that both of the frame-out prevention control and the size maintaining control are performed in the automatic tracking mode. Therefore, in a state after the zoom-out operation of the frame-out prevention control, the FA zoom process (step S115 to step S119) for maintaining the size of the subject (for the size maintaining control) which will be described hereinafter is not performed. In other words, when the frame-out prevention control is performed, the size maintaining control is restricted until the zoom-in operation of the frame-out prevention control is completed.

When it is determined that a preceding zoom operation is not a zoom-out operation for the frame-out prevention control in step S112, the process proceeds to step S115. In step S115, the FA zoom controller 122 compares the size of the subject of the reference subject information with a size of the subject detected in step S104. When the size of the subject detected in step S104 is larger than predetermined N1 times the size of the reference subject (N1>1), that is, when a ratio of the subject relative to the screen exceeds a predetermined value, the process proceeds to step S116 where the FA zoom-out operation described below is started. The FA zoom-out operation here corresponds to the zoom-out operation for the size maintaining control.

On the other hand, in step S115, when the size of the subject detected in step S104 is equal to or smaller than N1 times the size of the reference subject, the process proceeds to step S117. In step S117, the FA zoom controller 122 compares the size of the subject of the reference subject information with the size of the subject detected in step S104. When the size of the subject detected in step S104 is smaller than predetermined N2 times the size of the reference subject (N2<1), that is, when a ratio of the subject relative to the screen is smaller than a predetermined value, the process proceeds to step S118. On the other hand, when the size of the subject detected in step S104 is equal to or larger than N2 times the size of the reference subject, the process proceeds to step S107.

In step S118, it is determined whether the subject tracking frame of the subject to be tracked is included (incorporated) in the zoom-in region ZI. This determination is performed for preventing the subject from being out of a frame due to a zoom-in operation when the subject is located in a peripheral portion of the screen. The zoom-in region ZI here corresponds to the zoom-in region ZI described with reference to FIG. 6E. When it is determined that the subject tracking frame is not included in the zoom-in region ZI in step S118, the process proceeds to step S107. On the other hand, when it is determined that the subject tracking frame is included in the zoom-in region ZI, the process proceeds to step S119. In step S119, the FA zoom controller 122 starts the FA zoom-in operation described below. The FA zoom-in operation here corresponds to the zoom-in operation for the size maintaining control. As described above, in this embodiment, the zoom-in operation is started after the subject is included in the zoom-in region ZI in order to prevent the subject from being out of a frame also in the zoom-in operation for the size maintaining control.

In step S104, when the subject detection unit 123 has not detected a subject to be tracked, the process proceeds to step S124 of FIG. 9. In step S124, a camera movement determination is performed which will be described with reference to FIG. 13. For example, in a case where the reference subject is a person, when the subject moves in a state in which a face directs sideways or rearward, the subject may not be detected. In this case, even in a case where the subject is about to be out of the screen, the frame-out may not be prevented by control performed on the basis of the subject information. If the subject is out of a frame, in general, a photographer performs an operation of searching for the subject while performing panning of a camera.

Therefore, in this embodiment, a zoom-out operation is performed when a large movement of the digital still camera 100 caused by a panning operation is detected by the shake detection unit 125. Thereafter, when the digital still camera 100 is stopped, zoom-in is performed. In this way, a method for rapidly capturing a subject again may be provided. After the camera movement determination is performed in step S124, the process proceeds to step S125.

The determinations in step S125, step S126, step S128, and step S129 correspond to the determination for start of the FA zoom for assisting an operation of capturing the subject again when the subject is lost in the automatic search mode (a second mode). In step S125, it is determined whether a preceding zoom operation is a zoom-out operation in the automatic search mode in step S130 which will be described hereinafter. When the determination is affirmative, the process proceeds to step S126 whereas when the determination is negative, the process proceeds to step S128.

In step S128, the FA zoom controller 122 determines whether an amount of movement of the digital still camera 100 is large (the amount corresponds to a first amount which is larger than a predetermined amount) with reference to a result of the determination performed in step S124. When it is determined that the amount of movement of the digital still camera 100 is small in step S128, the process proceeds to step S107. On the other hand, when movement of the digital still camera 100 is large, the process proceeds to step S129. In step S129, the FA zoom controller 122 determines whether an operation member of the operation unit 117 has just been operated. Here, it is determined whether a predetermined period of time has been elapsed after the operation member of the operation unit 117 is operated. When it is determined that the operation member has just been operated in step S129, that is, when it is determined that the movement detected by the shake detection unit 125 is not a panning operation performed since a subject is lost but an operation caused by the operation of the operation member, the process proceeds to step S107. Here, the operation member includes at least one of the FA zoom operation switch, the release switch, a moving-image recording start/ stop switch, and the zoom lever. By the determination in step S129, an error operation of the FA zoom-out operation performed immediately after an operation of starting the automatic tracking mode, a start/stop operation of moving-image recording, and a manual zoom operation is prevented. On the other hand, it is determined that the movement of the digital still camera 100 is large and the movement is not caused by an operation of the operation member, the process proceeds to step S130 where the FA zoom-out operation (a first zoom operation) described hereinafter is started.

When it is determined that a preceding zoom operation corresponds to a zoom-out operation in the automatic search mode in step S125, the process proceeds to step S126. In step S126, the FA zoom controller 122 determines whether the digital still camera 100 is stopped (an amount of movement corresponds to a second amount which is smaller than a predetermined amount) with reference to a result of the determination performed in step S124. When it is determined that the digital still camera 100 is not stopped in step S126, the process proceeds to step S107. On the other hand, when it is determined that the digital still camera 100 is stopped, that is, when it is determined that the subject is captured again after the FA zoom-out operation, the process proceeds to step S127 where the FA zoom-in operation (a second zoom operation) described below is started.

In step S107, it is determined whether the release switch of the operation unit 117 has been pressed halfway (a second operation), that is, whether an operation of designating preparation of still-image shooting has been performed. When it is not determined that the release switch has been pressed halfway, the process proceeds to step S108. On the other hand, when it is determined that the release switch has been pressed halfway, the determination in step S107 is performed again. Specifically, while the release switch is pressed halfway, the FA zoom operation in the automatic tracking mode and the automatic search mode is temporarily stopped. It is assumed that this process is performed when the photographer desires to start the FA zoom-in operation at an arbitrary timing after the FA zoom-out operation is performed in the automatic search mode, for example.

In step S108, the FA zoom controller 122 determines whether a specific operation member of the operation unit 117 has been operated (a third operation). When it is determined that the operation member has not been operated, the process proceeds to step S110. On the other hand, when it is determined that the operation member has been operated, the process proceeds to step S109. In step S109, when the operation member is operated, the state in which a preceding zoom operation is the FA zoom-out operation which is used for the determinations in step S112 and step S125 is cancelled. The operation of the specific operation member includes at least one of an operation of fully pressing the release switch (still-image shooting), start/stop of moving-image recording using the moving-image recording start/stop switch, and a manual zoom operation using the zoom lever. This process is performed to prevent (restrict) an unnatural zoom operation such as a case where the FA zoom-in operation is performed immediately after still-image shooting, start of moving-image recording, and termination of moving-image recording and to preferentially execute a manual zoom operation of the photographer. Note that it is not necessarily the case that all the operations described above are included in the operation of the specific operation member, and the cancel of the zoom-out state may be applied to at least one of the operations.

First, in step S110, the FA zoom controller 122 determines whether the FA zoom operation switch of the operation unit 117 has been pressed. When the FA zoom operation switch has not been pressed, the process returns to step S104 so that the FA zoom start determination is performed again.

On the other hand, when the FA zoom operation switch has been pressed, the process proceeds to step S111 where the FA zoom controller 122 measures a period of time in which the FA zoom operation switch is pressed. Thereafter, even while the automatic tracking mode is executed, when a long-time depression is detected, the manual search mode is entered and the process proceeds to step S120 where FA zoom in the manual search mode is started. By this, even in a case where the FA zoom controller 122 does not detect a subject, an instruction for performing a zoom-out operation is issued in the manual search mode immediately after the photographer recognizes that a subject is out of a frame. In this way, frame-out may be prevented. When a short-time depression of the FA zoom operation switch is detected in step S111, the FA zoom function in the automatic tracking mode is terminated.

Next, the FA zoom-out operation and the FA zoom-in operation will be described with reference to FIGS. 11A and 11B. FIG. 11A is a flowchart illustrating the FA zoom-out operation performed in step S106 and step S116 of FIGS. 7A and 7B, step S121 of FIG. 8, and step S130 of FIG. 9.

First, in step S300, the FA zoom controller 122 obtains optical zoom magnification from the CZ controller 119 and obtains electronic zoom magnification from the electronic zoom controller 120. The FA zoom controller 122 stores data on the optical zoom magnification and data on the electronic zoom magnification in the memory 118. The optical zoom magnification represents a position of a zoom lens having a zoom magnification changeable by the optical zoom function. Furthermore, the electronic zoom magnification represents a magnification for enlargement and shrinkage of an image changeable by the electronic zoom function. In the frame-out prevention control in the manual search mode and the automatic tracking mode, the zoom magnification stored here is set as zoom returning magnification. In the automatic search mode, magnification changed to a wide-angle side by a predetermined amount relative to the obtained optical zoom magnification and the obtained electronic zoom magnification may be stored as zoom returning magnification. The process of storing zoom returning magnification in the automatic search mode will be described hereinafter with reference to FIG. 14.

Subsequently, in step S301, the FA zoom controller 122 obtains a zoom-out amount. In the manual search mode of the FA zoom function (step S121 of FIG. 8), a predetermined amount stored in the memory 118 is set as the zoom-out amount. Furthermore, the zoom-out amount may be changeable by an operation performed by the photographer using a setting menu.

In the automatic tracking mode of the FA zoom function (step S106 and step S116 of FIGS. 7A and 7B), the zoom-out amount is set in accordance with the detected subject information. Specifically, in the zoom-out operation for the frame-out prevention (step S106 of FIG. 7A), as a size of the subject is small, the zoom-out amount is set small. By this, occurrence of a case where the subject is not detected since a size of the subject is too small due to the zoom-out operation is avoided. Note that, taking the smallest size for detection of the subject into consideration, zoom-out may not be performed when a size of the subject is smaller than a predetermined size. Furthermore, in the zoom-out operation for maintaining a size (step S116 of FIG. 7B), 1/N1 of the predetermined zooming amount associated with the predetermined N1 times the size in the determination in step S115 is set. By this, even when a subject is not detected, a minimum zoom-out operation may be performed until the size of the subject becomes equal to a size of the reference subject. However, in order to maintain a certain size when the subject continuously moves toward the digital still camera 100 during the zoom-out operation, zoom is operated by an amount equal to or larger than a certain times the predetermined zooming amount, and a detailed description thereof will be described with reference to FIG. 12.

In the automatic search mode of the FA zoom function (step S130 of FIG. 9), the predetermined amount stored in the memory 118 is set as the zoom-out amount. Furthermore, the zoom-out amount may be associated with the menu setting of the manual search mode so as to be changeable. Furthermore, the zoom-out amount may be changed in accordance with an amount of a movement of the digital still camera 100.

In step S302, the FA zoom controller 122 determines whether the electronic zoom state has been entered. In a general zoom operation, when the zoom lever of the operation unit 117 is pressed, the CZ controller 119 drives optical zoom in a case where the optical zoom position is located between a wide-angle end to a telephoto end. When the optical zoom position corresponds to the telephoto end, and furthermore, an instruction for operation in the telephoto direction is issued, the electronic zoom controller 120 performs electronic zoom so as to enable super-telephoto photographing. To ensure consistency of the zoom operation using the zoom lever and the FA zoom operation, even in the FA zoom operation, if a zoom state is the electronic zoom state, the electronic zoom is performed first. Specifically, it is determined whether zoom magnification at a time of storage in the memory 118 is included in a zoom region in a preferential zoom state. Since the electronic zoom is preferentially performed in this embodiment, in step S302, it is determined whether the zoom magnification is included in an electronic zoom region. When the zoom magnification at a time of start of the FA zoom is included in the electronic zoom region, the process proceeds to step S303 whereas when the zoom magnification is not included in the electronic zoom region (that is, the zoom magnification is included in an optical zoom region), the process proceeds to step S305.

In step S303, the FA zoom controller 122 calculates zoom-out magnification of the electronic zoom in accordance with the electronic zoom magnification obtained in step S300 and the zoom-out amount obtained in step S301 and sets the obtained zoom-out magnification to the electronic zoom controller 120. The FA zoom controller 122 instructs the electronic zoom controller 120 to perform zooming processing until the set zoom-out magnification of the electronic zoom is reached. Then the electronic zoom controller 120 starts a zoom-out operation by the electronic zoom and the process proceeds to step S304.

In step S304, the FA zoom controller 122 stops the electronic zoom controller 120 in accordance with a condition for determining stop of zoom described below, such as a set mode, a control state in the automatic tracking mode, or a subject detection state. A zoom stop process will be described below with reference to FIG. 12. When the zoom-out operation of the electronic zoom is stopped in step S304, the process proceeds to step S305.

In step S305, the FA zoom controller 122 determines whether zoom-out of the optical zoom is to be performed. Specifically, when the electronic zoom is not sufficient for zooming by the set zoom-out amount, a remaining zoom-out amount is covered by the optical zoom. When it is determined that the zoom-out of the optical zoom is required, the process proceeds to step S306 whereas when it is determined that the zoom-out of the optical zoom is not required, the FA zoom-out operation is terminated.

In step S306, the FA zoom controller 122 calculates zoom-out magnification of the optical zoom in accordance with the optical zoom magnification and the zoom-out amount and sets the zoom-out magnification to the CZ controller 119. The FA zoom controller 122 instructs the CZ controller 119 to perform zoom driving until the set zoom-out magnification of the optical zoom is reached. Then the CZ controller 119 controls the zoom lens driving unit 113 so as to start a zoom-out operation of the optical zoom and the process proceeds to step S307.

Figure 12:
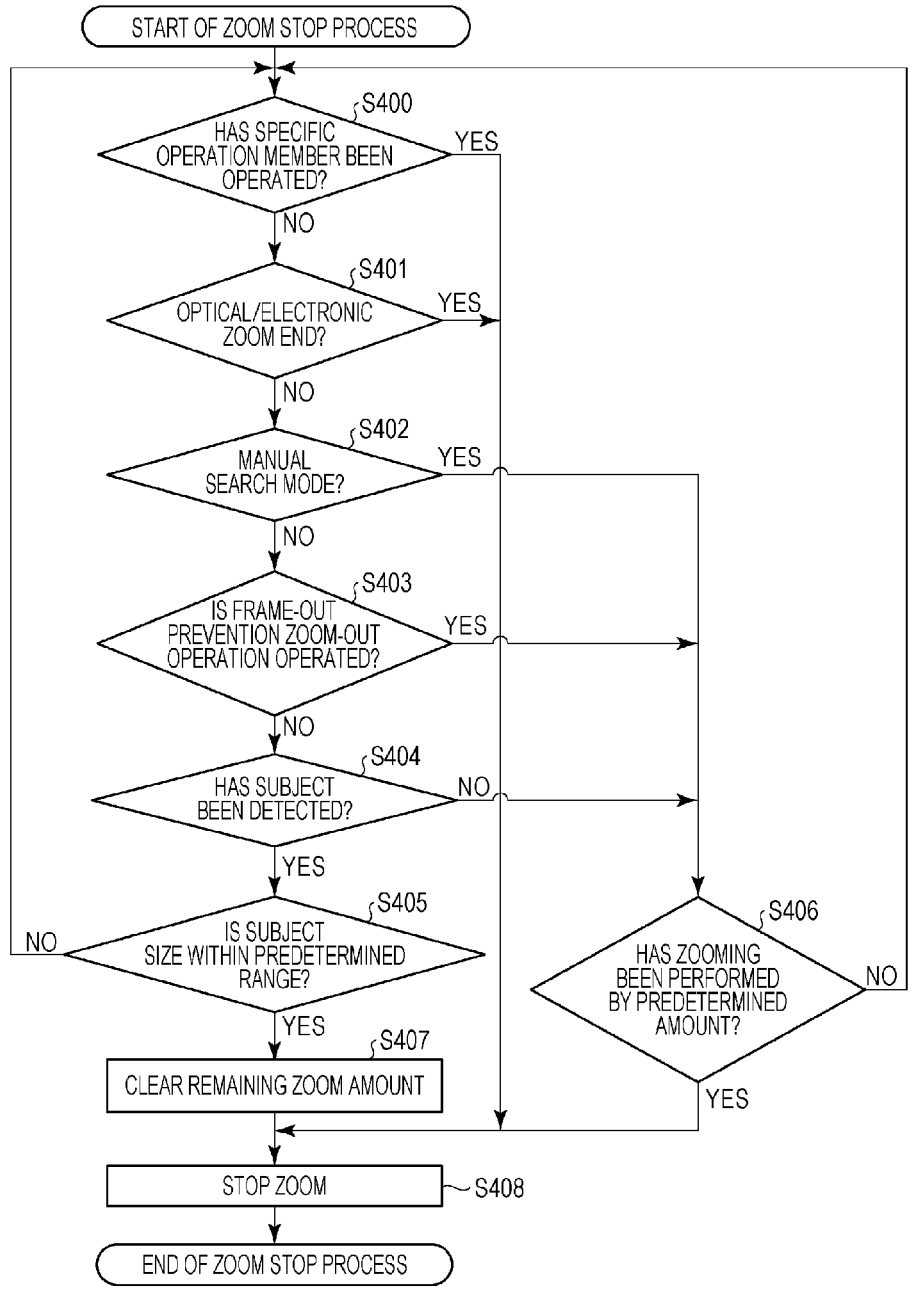
FIG. 12 is a flowchart illustrating a zoom stop determination.

In step S307, the FA zoom controller 122 stops the CZ controller 119 in accordance with the condition for determining the zoom stop which will be described hereinafter with reference to FIG. 12. When the zoom-out operation of the optical zoom is stopped in step S307, the FA zoom-out operation is terminated.

Next, the FA zoom-in operation will be described. FIG. 11B is a flowchart illustrating the FA zoom-in operation performed in step S114 and step S119 of FIGS. 7A and 7B, step S123 of FIG. 8, and step S127 of FIG. 9.

First, in step S308, the FA zoom controller 122 obtains a zoom-in amount. In the manual search mode (step S123 of FIG. 8), a zooming amount for zoom-in to the zoom returning magnification stored in the memory 118 in step S300 of FIG. 11A corresponds to the zoom-in amount. Furthermore, also in the zoom-in operation of the frame-out prevention in the automatic tracking mode (step S114 of FIG. 7A) and the zoom-in operation in the automatic search mode (step S127 of FIG. 9), a zooming amount for zoom-in to the zoom returning magnification stored in step S300 corresponds to the zoom-in amount. Furthermore, in the zoom-in operation for the size maintaining control in the automatic tracking mode (step S119 of FIG. 7B), 1/N2 of the predetermined zooming amount associated with the predetermined N2 times the size used in the determination in step S117 corresponds to the zoom-in amount.

Subsequently, in step S309, the FA zoom controller 122 determines whether the zoom magnification is included in the optical zoom region. When the zoom magnification is included in the optical zoom region, zoom-in of the optical zoom is preferentially performed, and the process proceeds to step S310. On the other hand, when the zoom magnification is not included in the optical zoom region (that is, the zoom magnification is included in the electronic zoom region), the zoom-in is performed only by the electronic zoom, and the process proceeds to step S312.

In step S310, the FA zoom controller 122 calculates zoom-in magnification of the optical zoom in accordance with the optical zoom magnification and the zoom-in amount obtained in step S308 and sets the zoom-in magnification to the CZ controller 119. The FA zoom controller 122 instructs the CZ controller 119 to perform zoom driving until the set zoom-in magnification of the optical zoom is reached. Then the CZ controller 119 controls the zoom lens driving unit 113 so as to start the zoom-in operation of the optical zoom and the process proceeds to step S311. In step S311, the CZ controller 119 is stopped in accordance with the condition for determining zoom stop which will be described hereinafter with reference to FIG. 12. When the zoom-in operation of the optical zoom is stopped in step S311, the process proceeds to step S312.

In step S312, the FA zoom controller 122 determines whether zoom-in of the electronic zoom is to be performed.

When the zoom-in of the electronic zoom is to be performed, the process proceeds to step S313. On the other hand, when the zoom-in of the electronic zoom is not to be performed, the FA zoom-in operation is terminated.

In step S313, the FA zoom controller 122 calculates zoom-in magnification of the electronic zoom in accordance with the zoom-in amount obtained in step S308 and sets the obtained zoom-in magnification to the electronic zoom controller 120. The FA zoom controller 122 instructs the electronic zoom controller 120 to perform zooming processing until the set zoom-in magnification of the electronic zoom is reached. Then the electronic zoom controller 120 starts a zoom-in operation by electronic zoom and the process proceeds to step S314.

In step S314, the electronic zoom controller 120 is stopped in accordance with the condition for determining the zoom stop which will be described hereinafter with reference to FIG. 12. When the zoom-in operation of the electronic zoom is stopped in step S314, the FA zoom-in operation is terminated.

Next, the zoom stop process performed in step S304 and step S307 of FIG. 11A and step S311 and step S314 of FIG. 11B will be described with reference to FIG. 12. First, in step S400, the FA zoom controller 122 determines whether a specific operation member of the operation unit 117 has been operated. When it is determined that the operation member has not been operated, the process proceeds to step S401. On the other hand, when it is determined that the operation member has been operated, the process proceeds to step S408 where a zoom operation currently performed is stopped. Examples of the operation of the specific operation member includes an operation of fully pressing the release switch (still-image shooting), start/stop of moving-image recording using the moving-image recording start/stop switch, and a manual zoom operation using the zoom lever. This process is performed to prevent an unnatural zoom operation such as a case where the FA zoom-in operation is continued immediately after still-image shooting or start/termination of the moving-image recording is performed in the FA zoom-in operation, and to preferentially execute a manual zoom operation of the photographer.

Next, in step S401, when the optical zoom is operated (step S307 of FIG. 11A and step S311 of FIG. 11B), the FA zoom controller 122 obtains optical zoom magnification from the CZ controller 119. On the other hand, when the electronic zoom is operated (step S304 of FIG. 11A and step S314 of FIG. 11B), the FA zoom controller 122 obtains electronic zoom magnification from the electronic zoom controller 120. When the obtained zoom magnification has reached a zoom wide-angle end (in a case of the zoom-out operation) or an electronic zoom telephoto end (in a case of the zoom-in operation), the process proceeds to step S408 where the zoom operation is stopped. When the zoom magnification has not reached the zoom ends, the process proceeds to step S402.

In step S402, the FA zoom controller 122 obtains information on the mode stored in the memory 118 in step S102 of FIG. 7A or step S120 of FIG. 8 and determines whether a current mode is the manual search mode or the automatic tracking mode. When the current mode is the manual search mode (step S121 and step S123 of FIG. 8), the process proceeds to step S406. On the other hand, when the current mode is the automatic tracking mode (step S106, step S114, step S116, and step S119 of FIGS. 7A and 7B), the process proceeds to step S403.

Subsequently, in step S403, the FA zoom controller 122 determines a type of zoom operation in the automatic tracking mode. When the zoom-out operation for the frame-out prevention control is in operation (step S106 of FIG. 7A), the process proceeds to step S406, and otherwise, the process proceeds to step S404.

Furthermore, in step S404, the FA zoom controller 122 determines whether a subject has been detected by the subject detection unit 123. When it is determined that a subject has been detected, the process proceeds to step S405 whereas when it is determined that a subject has not been detected, the process proceeds to step S406.

In step S405, the size of the subject of the reference subject information is compared with a size of the subject detected in step S404. As a result of the comparison, when a difference between the size of the subject detected in step S404 and the size of the reference subject is not within a predetermined range (within a predetermined variation amount), the process returns to step S401 where the determination of stop of zoom is continuously performed. When the difference is within the predetermined range due to the zoom operation, the process proceeds to step S407 where a remaining zoom amount is cleared (zero). This operation is performed to obtain a negative determination result in step S305 or step S312 by clearing the remaining zoom amount so that the zoom operation is terminated even when zooming is not performed by the zoom amount obtained in step S301 of FIG. 11A or step S308 of FIG. 11B. When the process of clearing the remaining zoom amount is terminated in step S407, the process proceeds to step S408 where the zooming currently operated is stopped.

Figure 11A:
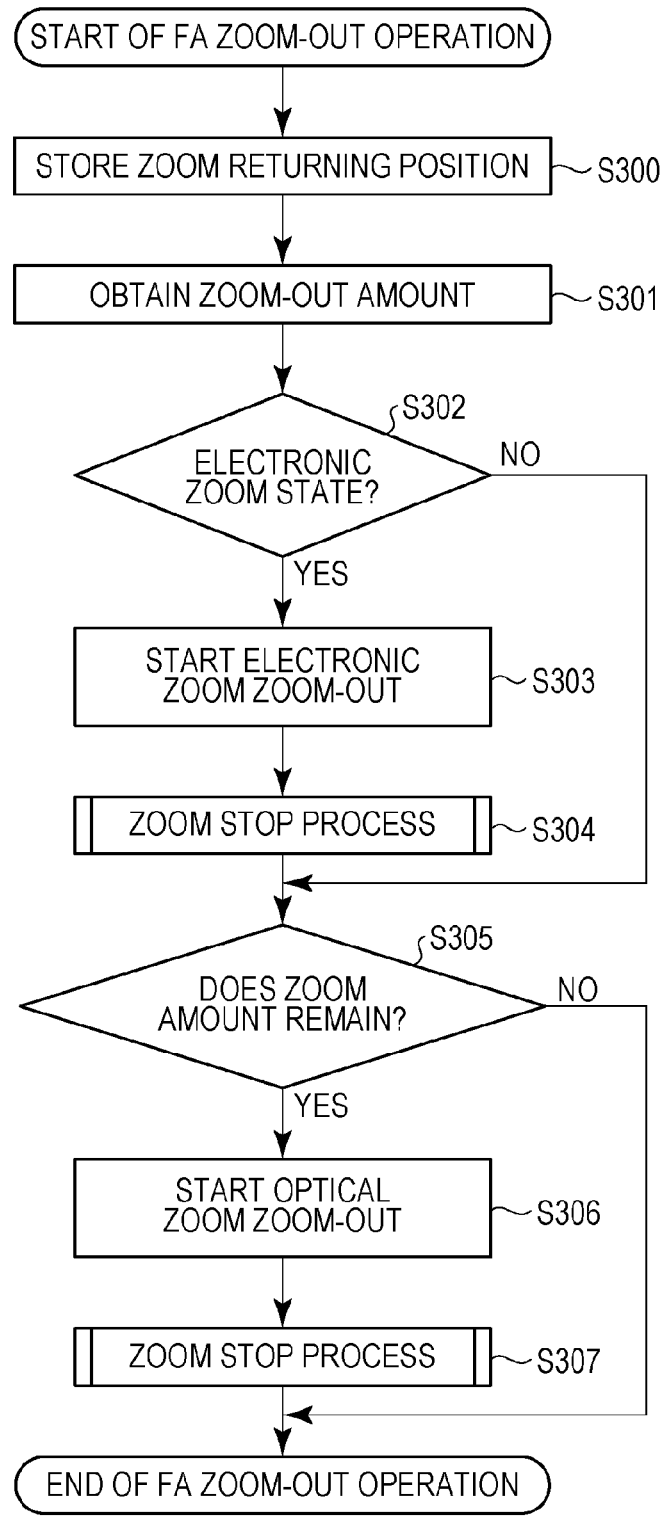
FIGS. 11A and 11B are flowcharts illustrating an FA zoom-out operation and an FA zoom-in operation, respectively.
Figure 11B:
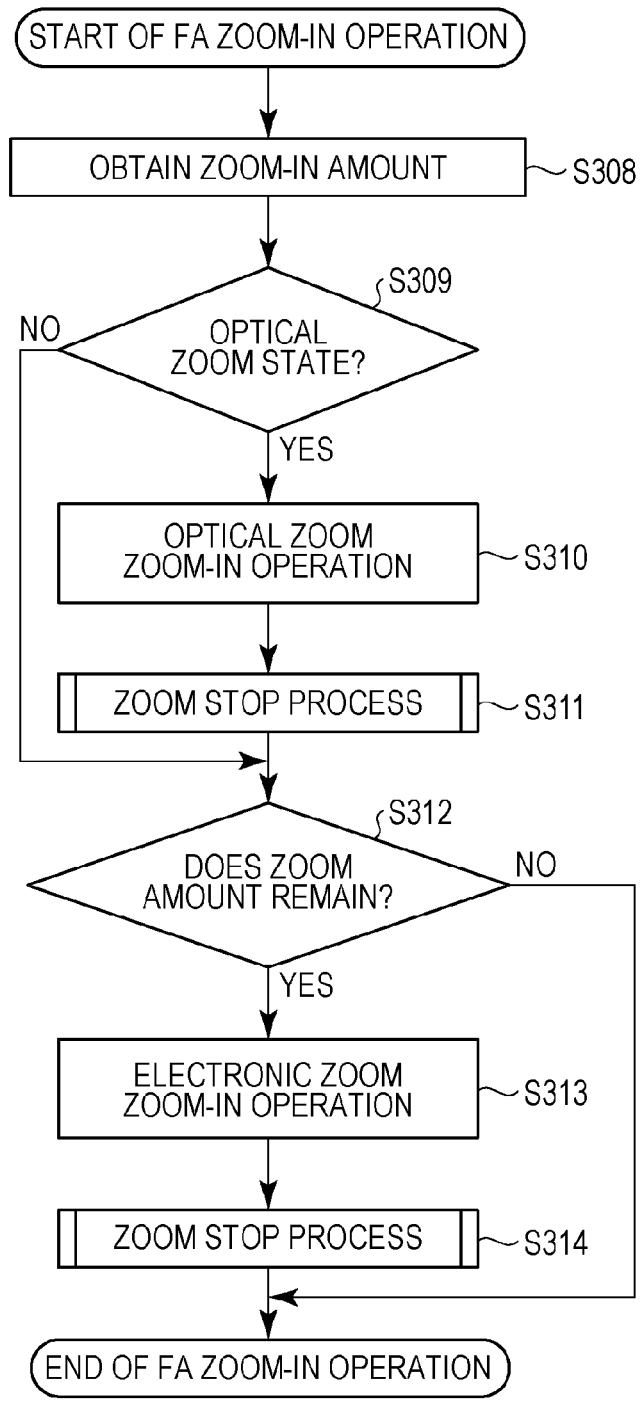

In step S406, the FA zoom controller 122 determines whether driving has been performed by a predetermined zoom amount of a corresponding one of the zoom operations in accordance with the zoom amount obtained in step S301 of FIG. 11A or step S308 of FIG. 11B. When zooming by the predetermined zoom amount has not been performed, the process returns to step S400 where the determination for stop of zoom is continued. When zooming by the predetermined zoom amount has been performed, the process proceeds to step S408 where the zoom currently operated is stopped.

Figure 13:
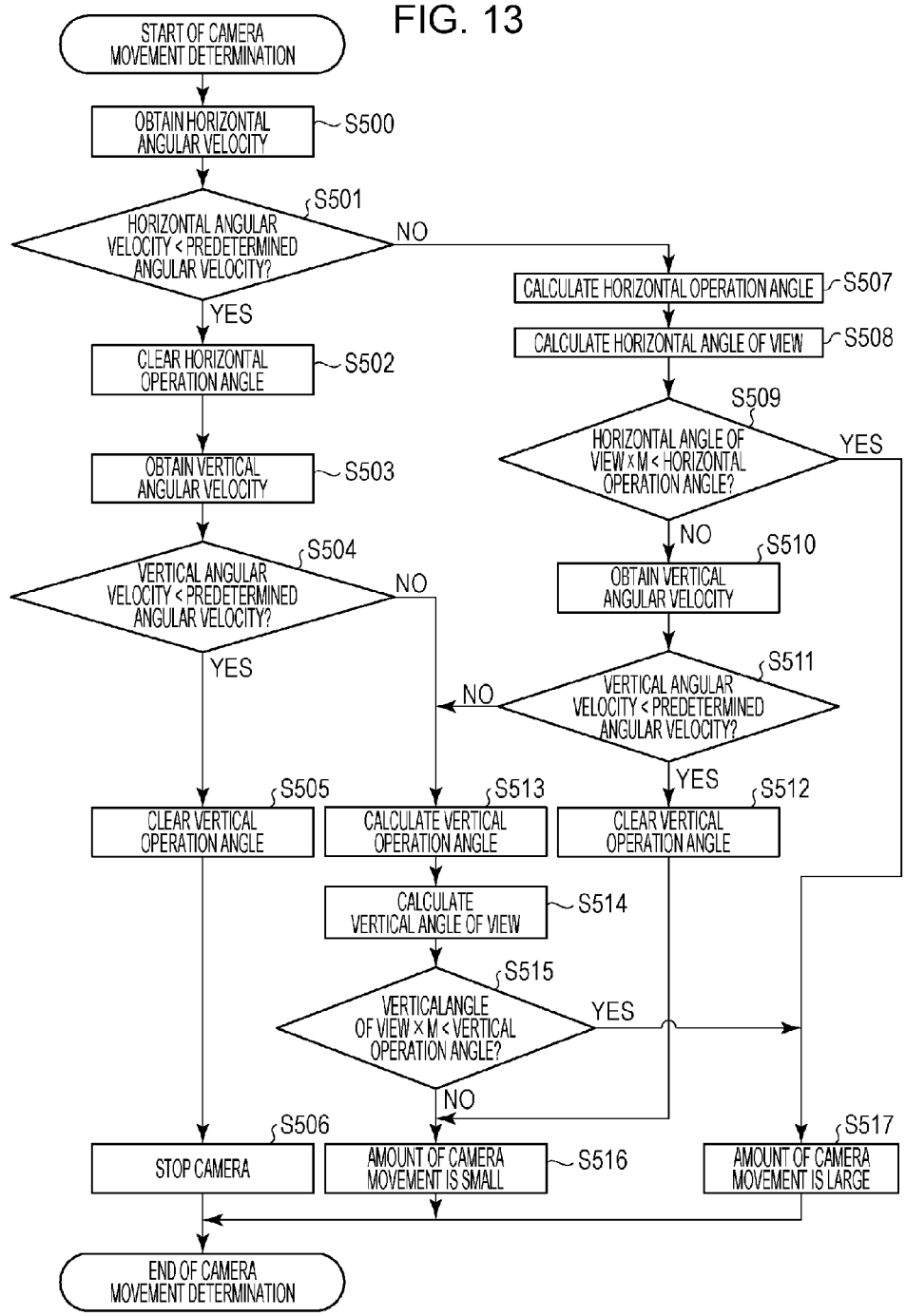
FIG. 13 is a flowchart illustrating a camera movement determination process.

Next, a process of determining a movement of the digital still camera 100 performed in step S124 of FIG. 9 will be described with reference to FIG. 13. FIG. 13 is a flowchart illustrating a camera movement determination process in the automatic search control.

In step S500, the FA zoom controller 122 obtains an angular velocity in a horizontal direction from the shake detection unit 125. Subsequently, in step S501, the FA zoom controller 122 determines whether the horizontal angular velocity obtained in step S500 is smaller than a predetermined angular velocity. When the horizontal angular velocity is smaller than the predetermined angular velocity, the process proceeds to step S502 whereas when the horizontal angular velocity is equal to or larger than the predetermined angular velocity, the process proceeds to step S507.

In step S502, a horizontal operation angle calculated in step S507 described below is cleared. This operation is performed to determine, assuming that a small angular velocity, that is, an operation angle obtained when the digital still camera 100 is stopped, is 0 degree, an operation angle on the basis of the operation angle as a movement of the digital still camera 100.

In step S503, the FA zoom controller 122 obtains an angular velocity in a vertical direction from the shake detection unit 125. Subsequently, in step S504, it is determined whether the vertical angular velocity obtained in step S503 is smaller than a predetermined angular velocity. When the vertical angular velocity is smaller than the predetermined angular velocity, the process proceeds to step S505 whereas when the vertical angular velocity is equal to or larger than the predetermined angular velocity, the process proceeds to step S513.

In step S505, a vertical operation angle calculated in step S513 described below is cleared. The vertical operation angle is set to 0 degree due to a reason the same as that in the case of the horizontal operation angle described above.

In step S506, it is determined that the digital still camera 100 is stopped since it is determined that the horizontal angular velocity and the vertical angle velocity are smaller than the predetermined angular velocities in step S501 and step S504, and the camera movement determination process is terminated.

On the other hand, when it is determined that the horizontal angular velocity is equal to or larger than the predetermined angular velocity in step S501, the process proceeds to step S507. In step S507, an operation angle in the horizontal direction is calculated. Assuming that the horizontal angular velocity obtained in step S500 is denoted by $\omega h$ and a control cycle is denoted by $\Delta T$, an angle moved in the control cycle $\Delta T$ is obtained by an expression "$\omega h \times \Delta T$". Furthermore, by adding a past vertical angular velocity, that is, by integrating the horizontal angular velocity, a horizontal operation angle may be obtained while a horizontal operation angle in a state in which the digital still camera 100 is stopped immediately before this process is set to 0 degree.

In step S508, the FA zoom controller 122 calculates a horizontal angle of view. Here, the FA zoom controller 122 obtains information in a focal length from the zoom lens driving unit 113 through the CZ controller 119. Furthermore, a horizontal angle of view is calculated on the basis of the horizontal size of the image pickup element 106. Assuming that the focal length is denoted by f and the horizontal size of the image pickup element 106 is denoted by h, the horizontal angle of view is obtained by an expression "$2 \times \arctan(2h/f)$".

In step S509, it is determined whether the horizontal operation angle calculated in step S507 is larger than a predetermined M times (M>0) the horizontal angle of view calculated in step S508. When the horizontal operation angle is larger than M times the horizontal angle of view, it is determined that the subject is out of the angle of view, and therefore, the digital still camera 100 is moved by an angle larger than the M times the horizontal angle of view, and the process proceeds to step S517. When the horizontal operation angle is equal to or smaller than M times the horizontal angle of view in step S509, the process proceeds to step S510.

As with the process from step S503 to step S505, in a process from step S510 to step S512, it is determined whether the vertical angular velocity is smaller than the predetermined angular velocity, and when it is determined that the vertical angular velocity is smaller than a predetermined angular velocity, the vertical operation angle is cleared and the process proceeds to step S516. When it is determined that the vertical angular velocity is equal to or larger than the predetermined angular velocity in step S511, the process proceeds to step S513.

In step S513 to step S515, as with the process in step S507 to step S509, a vertical operation angle and a vertical angle of view are calculated in the vertical direction and it is determined whether the vertical operation angle is larger than a value obtained by multiplying the vertical angle of view by M. In step S513, an operation angle in the vertical direction is calculated. Assuming that the vertical angular velocity obtained in step S503 or step S510 is denoted by $\omega v$ and a control cycle is denoted by $\Delta T$, an angle moved in the control cycle $\Delta T$ is obtained by an expression "$\omega v \times \Delta T$". Furthermore, by adding a past vertical angular velocity, that is, by integrating the vertical angular velocity, a vertical operation angle may be obtained while a vertical operation angle in a state in which the digital still camera 100 is stopped immediately before this operation is set to 0 degree.

In step S514, the FA zoom controller 122 calculates a vertical angle of view. Here, the FA zoom controller 122 obtains information on a focal length from the zoom lens driving unit 113 through the CZ controller 119. Furthermore, a vertical angle of view is calculated on the basis of the vertical size of the image pickup element 106. Assuming that the focal length is denoted by f and a horizontal size of the image pickup element 106 is denoted by v, the horizontal angle of view is obtained by an expression "$2 \times \arctan(2v/f)$".

In step S515, it is determined whether the horizontal operation angle calculated in step S513 is larger than a predetermined M times (M>0) the horizontal angle of view calculated in step S514. When the vertical operation angle is larger than M times the vertical angle of view, the process proceeds to step S517 whereas when the vertical operation angle is equal to or smaller than M times the vertical angle of view, the process proceeds to step S516.

In a case where at least one of the horizontal angular velocity and the vertical angular velocity is equal to or larger than the predetermined angular velocity and it is determined that both of the horizontal operation angle and the vertical operation angle are equal to or smaller than M times the angle of view, the process proceeds to step S516. Here, it is determined that an amount of movement of the digital still camera 100 is small and the camera movement determination process is terminated.

In a case where it is determined that at least one of the horizontal operation angle and the vertical operation angle is larger than M times the angle of view, the process proceeds to step S517, and it is determined that an amount of movement of the digital still camera 100 is large and the camera movement determination process is terminated.

Note that, although three results including "stop of the camera", "an amount of a movement of the camera is small", and "an amount of a movement of the camera is large" are described as results of the camera movement determination in this embodiment, forms of the determination results are not limited to these. Furthermore, the camera movement determination process may be performed at all times and a result of the determination may be obtained in step S124.

Here, movement detection sensitivity will be described. The movement detection sensitivity corresponds to the predetermined angular velocity determined in step S501, step S504, and step S511 and the predetermined M-fold value determined in step S509 and step S515. As for the predetermined angular velocity and the predetermined M-fold value, the smaller a setting value is, the higher a response speed of start of the FA zoom-out operation is, that is, the higher the movement detection sensitivity is. On the other hand, the larger a setting value is, the lower the response speed is, that is, the lower the movement detection sensitivity is. When a setting of the movement detection sensitivity is "high", the zoom operation may be performed in response to a small movement of the digital still camera 100. However, it is highly likely that malfunction occurs. On the other hand, when a setting of the movement detection sensitivity is "low", the zoom operation may not be performed when panning of the digital still camera 100 is performed. The movement detection sensitivity may be changed in accordance with a setting of the digital still camera 100 or a recording state. For example, the movement detection sensitivity may be changed depending on a setting of a photographing mode (a portrait mode, a sports mode, or the like) or may be changed between a state in which a moving image is captured and a state of framing in a still-image capturing. Furthermore, the movement detection sensitivity may be changed using a setting menu which will be described with reference to FIG. 15.

Figure 14:
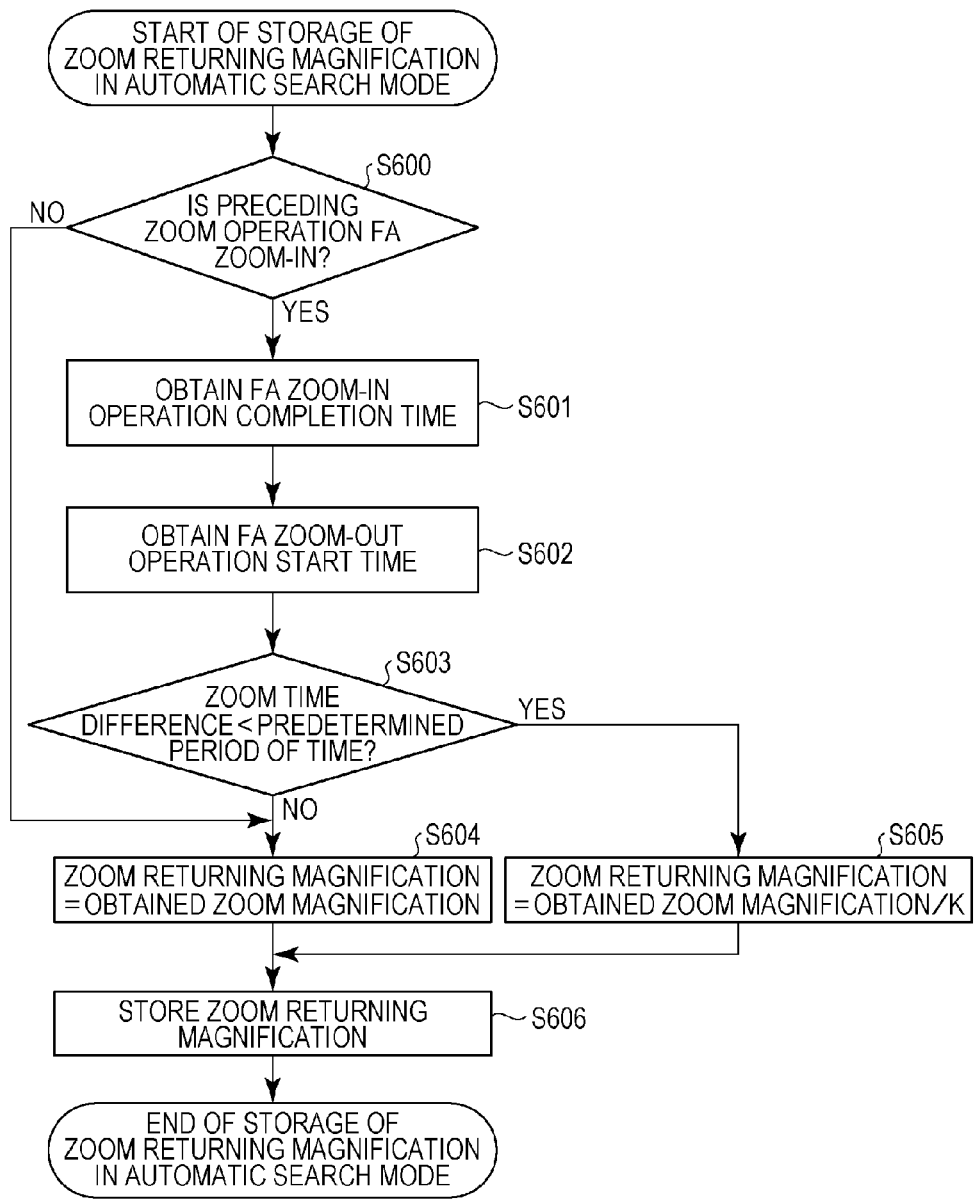
FIG. 14 is a flowchart illustrating a zoom returning magnification storage process in an automatic search mode.

Next, the zoom returning magnification (first zoom magnification) storage process executed in step S300 of FIG. 11A in the automatic search mode will be described with reference to FIG. 14. The zoom returning magnification normally correspond to the optical zoom magnification obtained from the CZ controller 119 and the electronic zoom magnification obtained from the electronic zoom controller 120 at a time of start of the FA zoom-out operation. However, in a case where a subject moves toward the digital still camera 100 after the zoom-out operation, for example, if zoom magnification obtained at a time of start of the FA zoom-out is used, the subject may be overly zoomed in. In this case, when panning of the digital still camera 100 is performed again, that is, when the FA zoom operation in the automatic search mode is performed, the zoom returning magnification is changed to the wide-angle side by a predetermined amount so that an angle of view may be easily corrected.

In step S600, it is determined whether a preceding zoom operation is the FA zoom-in operation performed in step S114 or step S119 of FIG. 7B or step S127 of FIG. 9. When a preceding zoom operation is the FA zoom-out operation or the zoom operation using the zoom lever, the process proceeds to step S604. On the other hand, when a preceding zoom operation is the FA zoom-in operation, the process proceeds to step S601.

In step S601, the FA zoom controller 122 obtains a time when the preceding FA zoom-in operation is completed which is stored in the memory 118, and the process proceeds to step S602. In step S602, the FA zoom controller 122 obtains a time when the FA zoom-out operation in the automatic search mode is to be started, that is, a time when a process of storing the zoom returning magnification, and the process proceeds to step S603.

In step S603, the FA zoom controller 122 determines whether a difference between the time when the preceding FA zoom-in operation is completed obtained in step S601 and the time when the FA zoom-out operation in the automatic search mode is started which is obtained in step S602 is smaller than a predetermined period of time. When the difference between the FA zoom-in operation completion time and the FA zoom-out operation start time is equal to or larger than the predetermined period of time (a second period of time), the process proceeds to step S604. In step S604, the optical zoom magnification obtained from the CZ controller 119 and the electronic zoom magnification obtained from the electronic zoom controller 120 is set as the zoom returning magnification.

On the other hand, when the difference between the FA zoom-in operation completion time and the FA zoom-out operation start time is smaller than the predetermined period of time (a first period of time), that is, when the FA zoom-out operation is performed again immediately after the FA zoom-in, the process proceeds to step S605. In step S605, the zoom returning magnification is set to 1/K of magnification (K>1) changed to the wide-angle side relative to the optical zoom magnification obtained from the CZ controller 119 and the electronic zoom magnification obtained from the electronic zoom controller 120.

In step S606, the FA zoom controller 122 stores the zoom returning magnification calculated in step S604 and step S605 in the memory 118, and the process of storing the zoom returning magnification in the automatic search mode is terminated.

Next, items settable in the setting menu will be described with reference to FIG. 15. FIG. 15 is a diagram illustrating the setting menu displayed in the display unit 109. Examples of items settable in the setting menu include a zoom-out amount (a zoom operation amount) in the FA zoom-out operation, a mode setting such as the automatic tracking mode and the automatic search mode, and movement detection sensitivity in the automatic search mode.

In FIG. 15, a term "zoom-out amount" represents the zoom-out amount obtained in step S301 of FIG. 11A. For example, magnifications such as ⅙, ¼, and ½ of a zoom-in angle of view corresponding to settings of "large", "medium", and "small" are stored in memory 118 so that the zoom-out amount may be obtained depending on the setting.

In an "automatic mode setting", an on/off setting is performed for each of the automatic tracking mode and the automatic search mode so that each of the modes is enabled.

FIG. 15A is a diagram illustrating a state of display in which both of the automatic tracking mode and the automatic search mode are set to an off state. In the case of this setting, even when the FA zoom operation switch is pressed for a short period of time in step S101 of FIG. 7A, the process in the automatic tracking mode and the automatic search mode performed in step S102 onward is not performed.

FIG. 15B is a diagram illustrating a state of display in which the automatic tracking mode is set to an on state. In the case of this setting, even when a subject is not detected in step S103 of FIG. 7A, the process in the automatic search mode performed in step S120 onward is not performed.

FIG. 15C is a diagram illustrating a state of display in which the automatic search mode is set to an on state. In the case of this setting, the subject designation process in step S103 of FIG. 7A is not performed, and even when a subject is detected, the process in the automatic tracking mode performed in step S105 onward is not performed.

FIG. 15D is a diagram illustrating a state of display in which both of the automatic tracking mode and the automatic search mode are in an on state. In the case of this setting, the entire process of FIGS. 7A and 7B is performed.

The setting of the "movement detection sensitivity" is enabled when the automatic search mode is in an on state, and the predetermined angular velocity determined in step S501, step S504, and step S511 of FIG. 13 and the predetermined M-fold value determined in step S509 and step S515 of FIG. 13 are set. For example, when the setting of the movement detection sensitivity is "high", the predetermined angular velocity and the predetermined M-fold value are set small whereas when the setting of the movement detection sensitivity is "low", the predetermined angular velocity and the predetermined M-fold value are set large. By this, the detection sensitivity of a panning operation in the automatic search mode is changeable using the setting menu to suit a photographing scene or photographer's tastes. Note that the movement detection sensitivity may have three or more types of settings in addition to "high" and "low". Furthermore, only one of the predetermined angular velocity and the predetermined M-fold value may be changed.

As described above, in this embodiment, a movement of the digital still camera 100 is detected, and when the digital still camera 100 is considerably moved, it is determined that the digital still camera 100 is searching for a subject and a zoom-out operation is automatically performed. If the digital still camera 100 is stopped in a zoom-out state, it is determined that the subject is captured again and a zoom-in operation is performed. By this control, when the subject is lost, the subject may be rapidly captured again.

Although the preferred embodiment of the present invention has been described hereinabove, the present invention is not limited to apparatuses mainly used for photographing, such as a digital still camera, and the present invention is applicable to arbitrary apparatuses, such as cellular phones, personal computers (including laptop computers, desktop computers, and tablet computers), and game machines, which incorporate an image pickup apparatus or which is connected to an external image pickup apparatus. Accordingly, the "image pickup apparatus" in this specification incorporates arbitrary electronic apparatuses having an image pickup function. Furthermore, the present invention is applicable to not only a case where an angle of view is adjusted for still-image photographing but also a case where an angle of view is adjusted in recording of a moving image.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-245899 filed Nov. 28, 2013, which is hereby incorporated by reference herein in its entirety.

What is claimed is:

1. An image pickup apparatus comprising:
one or more processors; and
at least one memory storing instructions that, when executed by the one or more processors, cause the one or more processors to control:
a movement detection unit configured to detect a movement of the image pickup apparatus;
a subject detection unit configured to detect a subject in an image obtained by the image pickup apparatus;
a setting unit configured to set a mode for controlling a zoom operation which mode is individually enabled as a first mode or a second mode; and
a control unit configured to control the zoom operation in accordance with the mode set by the setting unit,
wherein, in the first mode, the control unit controls the zoom operation in accordance with at least one of a position and a size of the subject detected by the subject detection unit,
wherein, in the second mode, the control unit performs a determination of whether to perform a first zoom operation for changing a zoom magnification to a wide-angle side based on a movement amount of the image pickup apparatus, controls the zoom operation based on a result of the determination, performs the first zoom operation when the movement amount of the image pickup apparatus corresponds to a first amount which is larger than a predetermined amount, and performs a second zoom operation for changing the zoom magnification to a telephoto side when a movement amount of the image pickup apparatus detected after execution of the first zoom operation corresponds to a second amount which is smaller than the predetermined amount, and
wherein the setting unit performs switching between the first mode and second mode according to whether or not a subject is detected by the subject detection unit.

2. The image pickup apparatus according to claim 1, wherein
the movement detection unit is in communication with an angular velocity detection unit configured to detect an angular velocity, and
the control unit determines the movement amount of the image pickup apparatus in accordance with the angular velocity detected by the angular velocity detection unit.

3. The image pickup apparatus according to claim 2, wherein
the control unit calculates an operation angle by integrating the angular velocity when the angular velocity detected by the angular velocity detection unit is larger than a predetermined angular velocity, and in addition, calculates an angle of view of the image pickup apparatus and determines the movement amount of the image pickup apparatus in accordance with the operation angle and the angle of view.

4. The image pickup apparatus according to claim 3, wherein
the control unit determines that the movement amount of the image pickup apparatus is larger than the predetermined amount when the operation angle is larger than a prescribed-fold angle of view.

5. The image pickup apparatus according to claim 4, wherein
at least one of the predetermined angular velocity and the prescribed-fold setting value is changed in accordance with a photographing mode or a recording state of the image pickup apparatus.

6. The image pickup apparatus according to claim 1, wherein the one or more processors further control a unit for changing, in the second mode, a condition for executing the first zoom operation.

7. The image pickup apparatus according to claim 1, wherein
the control unit sets a first zoom magnification and changes the zoom magnification to a wide-angle side relative to the first zoom magnification in the first zoom operation, and changes the zoom magnification to the set first zoom magnification when the second zoom operation is performed after the first zoom operation.

8. The image pickup apparatus according to claim 7, wherein
the control unit changes the first zoom magnification for the next first zoom operation in accordance with a period of time from when the second zoom operation is performed to when the next first zoom operation is performed.

9. The image pickup apparatus according to claim 7, wherein
when a period of time from when the second zoom operation is performed to when a next first zoom operation is performed corresponds to a first time, the control unit sets the first zoom magnification in the next first zoom operation to a wide-angle side relative to the first zoom magnification.

10. The image pickup apparatus according to claim 1, wherein
when a subject is not detected by the subject detection unit, the control unit controls a zoom operation in the second mode.

11. The image pickup apparatus according to claim 1, wherein
when a first operation is performed by a user via an operation unit, the control unit starts control of the zoom operation in the first mode or the second mode.

12. The image pickup apparatus according to claim 1, wherein
in the first mode and the second mode, while a user performs a second operation, the control unit performs control such that a zoom operation is temporarily stopped.

13. The image pickup apparatus according to claim 12, wherein
the second operation instructs preparation of still-image shooting.

14. The image pickup apparatus according to claim 1, wherein
when a user performs a third operation in the first mode or the second mode, the control unit restricts a zoom operation to a telephoto side.

15. The image pickup apparatus according to claim 14, wherein
the third operation includes at least one of operations instructing the still-image shooting, start of moving-image recording, termination of moving-image recording, and a manual zoom.

16. The image pickup apparatus according to claim 1, wherein
when the subject detection unit detects a subject in the second mode, the control unit performs switching to the first mode.

17. The image pickup apparatus according to claim 1, wherein
the control unit restricts execution of the second mode until a predetermined period of time is elapsed after a predetermined operation is performed by a user.

18. The image pickup apparatus according to claim 17, wherein
the predetermined operation includes at least one of operations instructing still-image shooting, start of moving-image recording, termination of moving-image recording, manual zoom, and start of zoom operation control in the first mode or the second mode.

19. The image pickup apparatus according to claim 1, wherein the one or more processors further control a unit for setting an amount of a zoom operation to the wide-angle side performed by the control unit.

20. The image pickup apparatus according to claim 1, further comprising:
a display unit configured to display an image,
wherein when a subject is detected by the subject detection unit, the display unit displays the detected subject.

21. The image pickup apparatus according to claim 20, wherein changing a zoom magnification corresponds to changing an angle of view of an image displayed on the display unit.

22. The image pickup apparatus according to claim 1, wherein, in the second mode, the control unit sets a first zoom magnification and performs the first zoom operation when the movement amount of the image pickup apparatus corresponds to the first amount which is larger than the predetermined amount, and the control unit performs the second zoom operation in which the zoom magnification is changed to the set first zoom magnification when the movement amount of the image pickup apparatus detected after execution of the first zoom operation corresponds to a second amount which is smaller than the predetermined amount, and
wherein the control unit changes the first zoom magnification in the next first zoom operation in accordance with a period of time from when the second zoom operation is performed to when the next first zoom operation is performed.

23. A method for controlling an image pickup apparatus, the apparatus including one or more processors and at least one memory storing instructions that, when executed by the one or more processors, cause the one or more processors to execute a method comprising:
detecting a movement of the image pickup apparatus;
detecting a subject in an image;
setting a mode for controlling a zoom operation which mode is individually enabled as a first mode or a second mode; and
controlling the zoom operation in accordance with the enable mode,
wherein, in the first mode, the zoom operation is controlled in accordance with at least one of a position and a size of the detected subject,
wherein, in the second mode, whether to perform a first zoom operation for changing a zoom magnification to a wide-angle side is determined based on a movement amount of the image pickup apparatus, the zoom operation being based on a result of the determination, the first zoom operation is performed when the movement amount of the image pickup apparatus corresponds to a first amount which is larger than a predetermined amount, and a second zoom operation for changing the zoom magnification to a telephoto side is performed when a movement amount of the image pickup apparatus detected after execution of the first zoom operation corresponds to a second amount which is smaller than the predetermined amount, and
wherein switching between the first mode and second mode according to whether or not a subject is detected by the subject detection unit.

24. A non-transitory recording medium which stores the instructions that, when executed by the one or more processors, cause the one or more processors to execute a method for controlling set forth in claim 23.

25. The image pickup apparatus according to claim 1, wherein, in the first mode, the control unit determines whether to change the zoom magnification based on at least one of the position and the size of the subject detected by the subject detection unit.

26. The image pickup apparatus according to claim 25, wherein, in the first mode, the control unit changes the zoom magnification to be smaller in a case where the subject detected by the subject detection unit is in a position in a first region and changes the zoom magnification to be larger in a case where the subject is in a position in a second region, the second region being located closer to a center of an imaging range than the first region.

* * * * *